(12) United States Patent
Takeda et al.

(10) Patent No.: US 11,329,856 B2
(45) Date of Patent: May 10, 2022

(54) USER TERMINAL, RADIO BASE STATION, AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/072,462

(22) PCT Filed: Jan. 25, 2017

(86) PCT No.: PCT/JP2017/002423
§ 371 (c)(1),
(2) Date: Jul. 24, 2018

(87) PCT Pub. No.: WO2017/130990
PCT Pub. Date: Aug. 3, 2017

(65) Prior Publication Data
US 2019/0036758 A1    Jan. 31, 2019

(30) Foreign Application Priority Data

Jan. 29, 2016 (JP) .............................. JP2016-016194

(51) Int. Cl.
*H04L 5/00* (2006.01)
*H04L 27/26* (2006.01)
*H04L 5/14* (2006.01)
*H04W 72/04* (2009.01)

(52) U.S. Cl.
CPC ............ *H04L 27/2666* (2013.01); *H04L 5/14* (2013.01); *H04L 27/2602* (2013.01); *H04W 72/042* (2013.01); *H04L 5/001* (2013.01); *H04L 5/0082* (2013.01); *H04W 72/0446* (2013.01)

(58) Field of Classification Search
None
See application file for complete search history.

(56) References Cited

U.S. PATENT DOCUMENTS

| 10,361,836 B2 * | 7/2019 | Lee .................... H04W 72/1289 |
| 2012/0039275 A1 * | 2/2012 | Chen ...................... H04L 5/001 370/329 |
| 2014/0226607 A1 | 8/2014 | Holma et al. |

(Continued)

OTHER PUBLICATIONS

Huawei, et al.; "Control signaling enhancements for short TTI"; 3GPP TSG RAN WG1 Meeting #83, R1-156461; Anaheim, USA; Nov. 15-22, 2015 (6 pages).

(Continued)

*Primary Examiner* — Ajit Patel
(74) *Attorney, Agent, or Firm* — Osha Bergman Watanabe & Burton LLP

(57) ABSTRACT

To appropriately communicate even when a shortened TTI is applied. A user terminal that communicates using a first Transmission Time Interval (TTI) and a second TTI whose TTI length is shorter than a TTI length of the first TTI, includes a receiving section that receives an L1/L2 control channel transmitted from a radio base station, and a control section that controls receiving of a first L1/L2 control channel transmitted for each first TTI and a second L1/L2 control channel transmitted at the second TTI.

5 Claims, 21 Drawing Sheets

(56) References Cited

U.S. PATENT DOCUMENTS

| | | | |
|---|---|---|---|
| 2014/0286277 A1* | 9/2014 | Jang | H04L 5/0048 |
| | | | 370/329 |
| 2014/0314036 A1* | 10/2014 | Takeda | H04L 5/0048 |
| | | | 370/329 |
| 2014/0334397 A1* | 11/2014 | Chen | H04L 5/0044 |
| | | | 370/329 |
| 2015/0188650 A1 | 7/2015 | Au et al. | |
| 2016/0021657 A1 | 1/2016 | Chen et al. | |
| 2016/0095105 A1* | 3/2016 | Chen | H04L 1/1671 |
| | | | 370/329 |
| 2016/0143008 A1* | 5/2016 | Lee | H04W 72/042 |
| | | | 370/336 |
| 2017/0290008 A1* | 10/2017 | Tooher | H04L 1/1893 |
| 2017/0325164 A1* | 11/2017 | Lee | H04W 76/28 |
| 2018/0145802 A1* | 5/2018 | Hwang | H04W 72/0453 |
| 2018/0288745 A1* | 10/2018 | Davydov | H04L 5/0044 |
| 2018/0323950 A1* | 11/2018 | Feng | H04L 1/1657 |

OTHER PUBLICATIONS

ETRI; "Discussion on TTI shortening"; 3GPP TSG RAN WG1 Meeting #83, R1-157110; Anaheim, USA; Nov. 16-20, 2015 (7 pages).

LG Electronics; "Discussion on specification impact for latency reduction techniques"; 3GPP TSG RAN WG1 Meeting #83, R1-156902; Anaheim, USA; Nov. 16-20, 2105 (6 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

International Search Report issued in PCT/JP2017/002423 dated Apr. 25, 2017 (1 page).

Written Opinion issued in PCT/JP2017/002423 dated Apr. 25, 2017 (4 pages).

Extended European Search Report issued in European Application No. 17744220.9, dated Aug. 5, 2019 (7 pages).

Office Action issued in Indian Application No. 201817025952; dated Feb. 23, 2021 (6 pages).

Office Action issued in European Application No. 17744220.9; dated Mar. 3, 2021 (6 pages).

Notice of Reasons for Refusal issued in Japanese Application No. 2017-564282, dated Apr. 20, 2021 (6 pages).

Dahlman, et al.; "4G; LTE/LTE-Advanced for Mobile Broadband"; Second Edition; Waltham, MA, USA; 2014 (509 pages).

Office Action in couterpart Japanese Patent Application No. 2017-564282 dated Jul. 20, 2021 (4 pages).

* cited by examiner

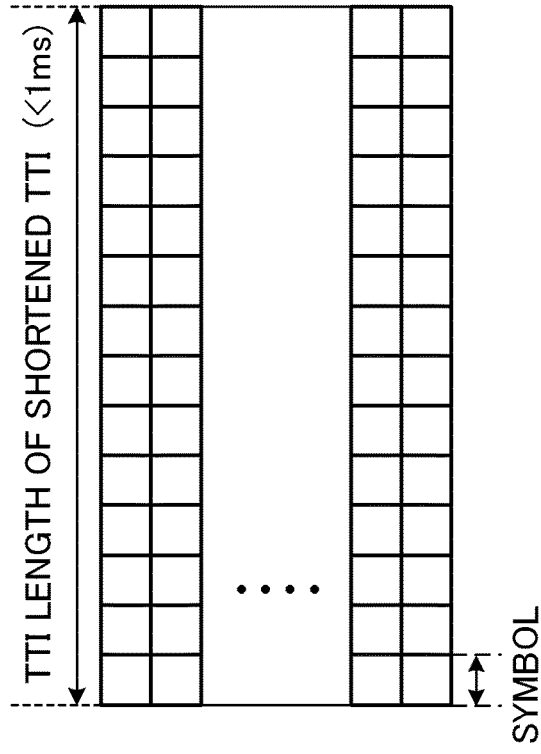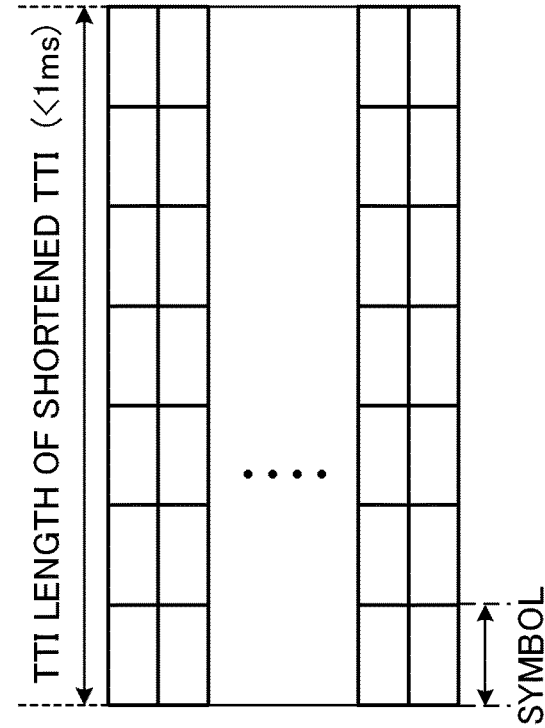
FIG. 3A
FIG. 3B

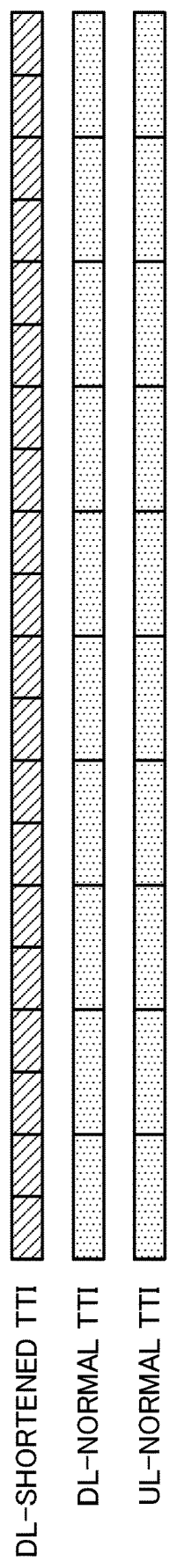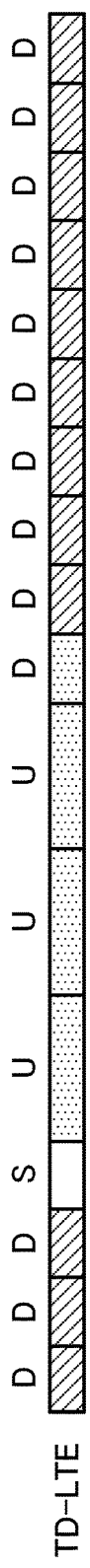
FIG. 4A
FIG. 4B
FIG. 4C

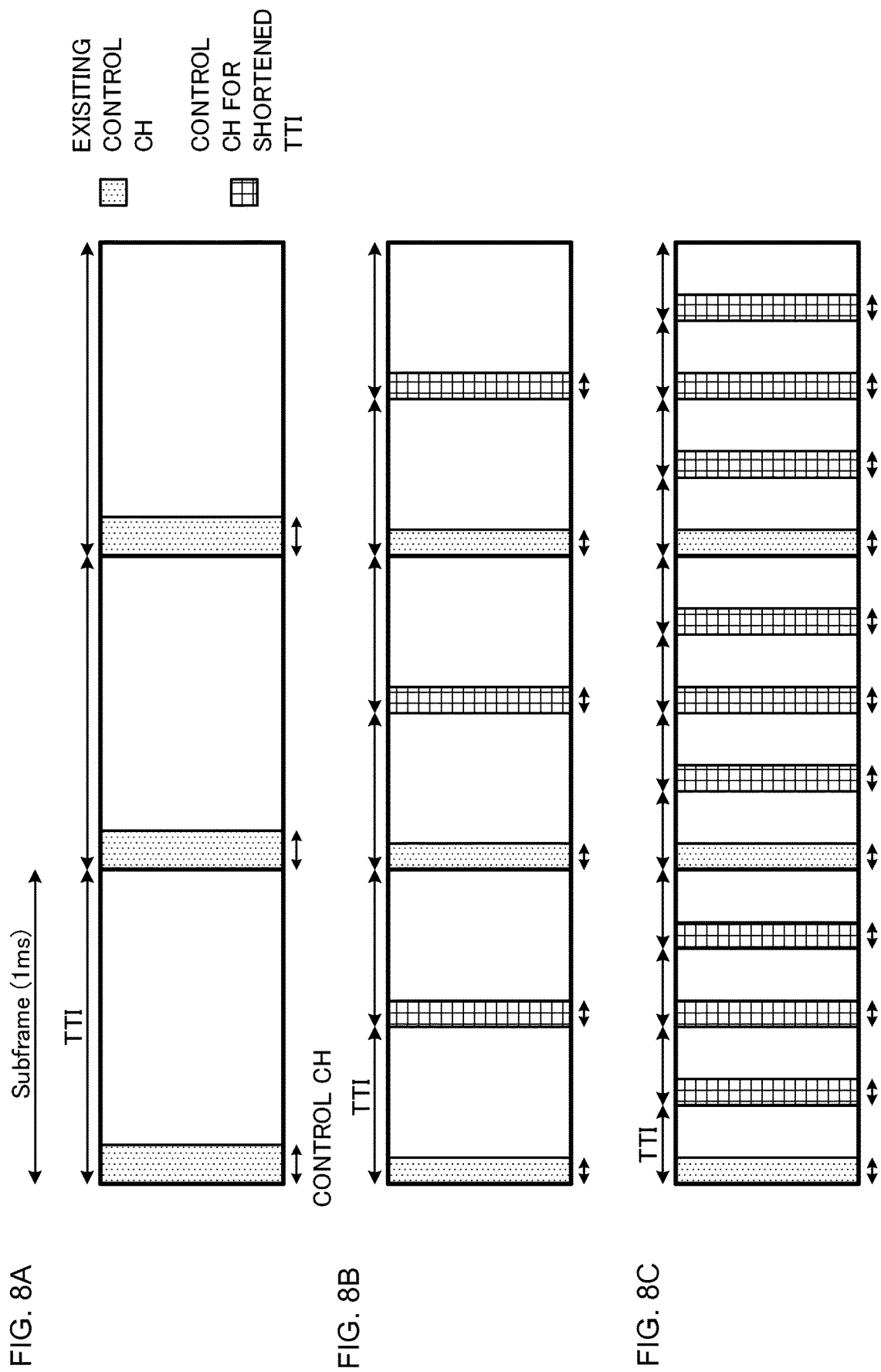

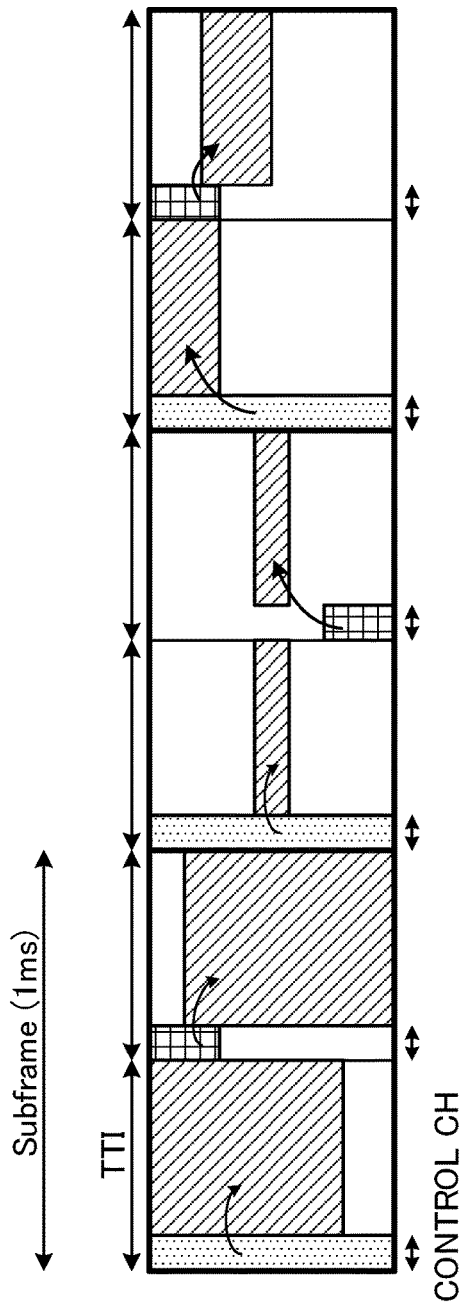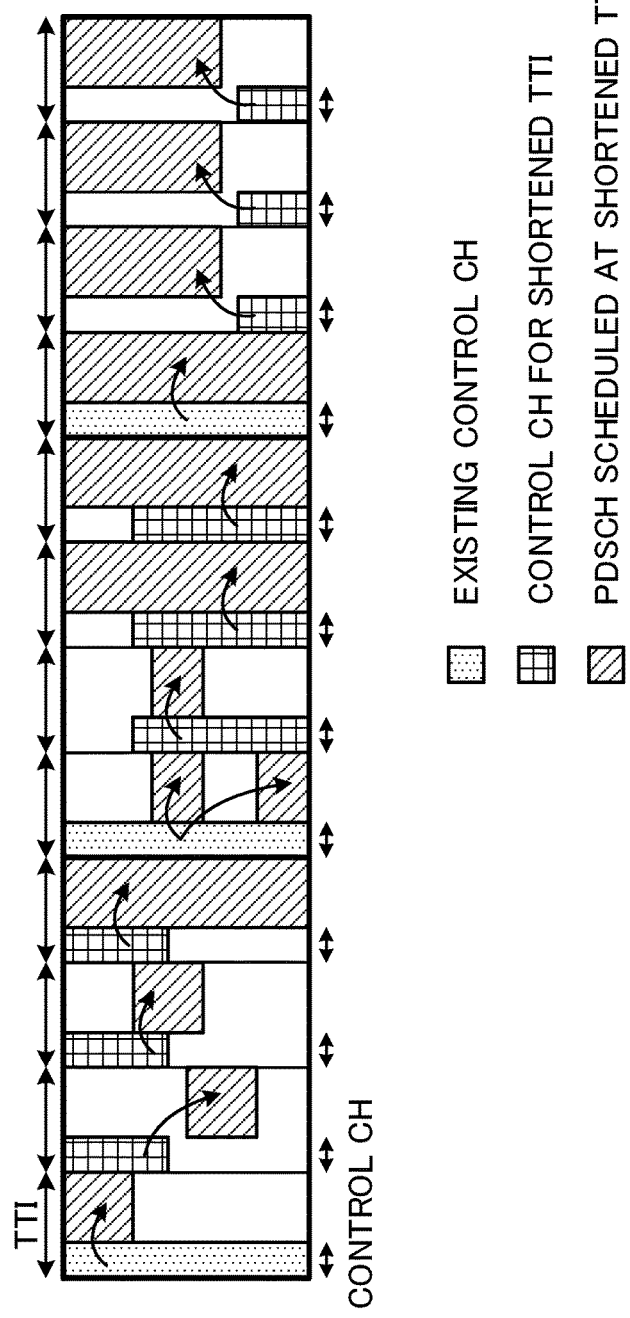
FIG. 10A
FIG. 10B

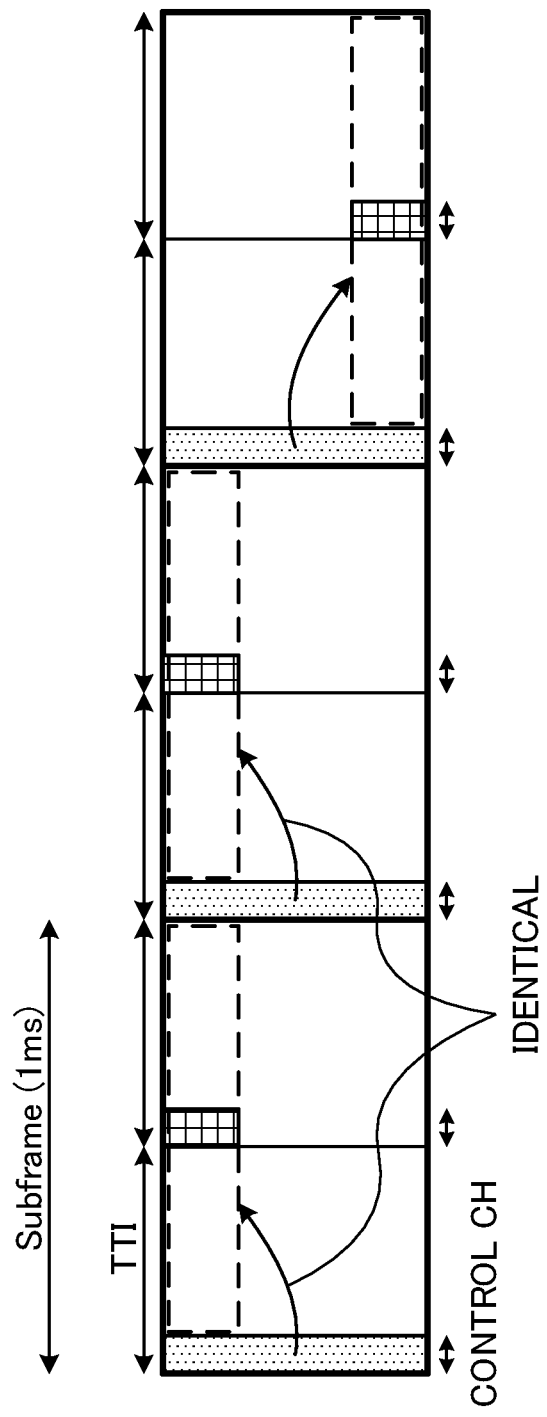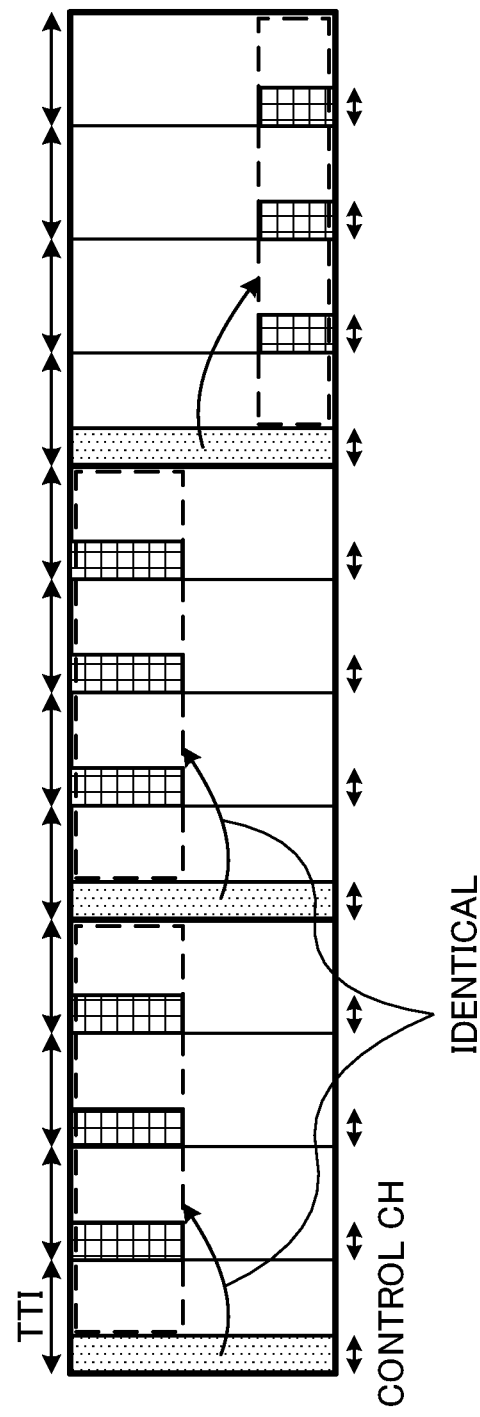
FIG. 13A
FIG. 13B

USER TERMINAL, RADIO BASE STATION, AND RADIO COMMUNICATION METHOD

TECHNICAL FIELD

The present invention relates to a user terminal, a radio base station, and a radio communication method in a next generation mobile communication system.

BACKGROUND ART

In Universal Mobile Telecomunication System (UMTS) networks, for the purpose of higher data rates, low latency, and the like, Long Term Evolution (LTE) has been specified (Non-Patent Literature 1). For the purpose of achieving further broadbandization and increased speed beyond LTE (in other words, LTE Rel.8), LTE-ADVANCED (in other words, LTE Rel.10, 11, or 12) is specified, and a succeeding system (of LTE Rel.13 and after LTE Rel.13) is also examined.

In LTE Rel.10/11, for broadbandization, Carrier Aggregation (CA) that aggregates a plurality of Component Carriers (CCs) has been introduced. Each CC is configured with a system band of LTE Rel.8 as one unit. In the CA, a plurality of CCs in an identical radio base station (eNB: eNodeB) are configured at a user terminal (UE: User Equipment).

On the other hand, in LTE Rel.12, Dual Connectivity (DC) where a plurality of Cell Groups (CGs) in different radio base stations are configured at a user terminal has been also introduced. Each cell group is constituted of at least one cell (CC). In the DC, the plurality of CCs in the different radio base stations are aggregated. Thus, the DC is also referred to as, for example, Inter-eNB CA.

In the existing system (LTE Rel.8 to 12), Frequency Division Duplex (FDD) that performs Downlink (DL) transmission and Uplink (UL) transmission with different frequency bands, and Time Division Duplex (TDD) that performs the DL transmission and the UL transmission with an identical frequency band by temporally switching them have been introduced. For example, in the TDD, it is strictly determined whether each sub-frame is used for the uplink (UL) or used for the downlink (DL), based on UL/DL configuration.

In the existing systems as described above, a Transmission Time Interval (TTI) applied for the DL transmission and the UL transmission between the radio base station and the user terminal is set at 1 ms to be controlled. The Transmission Time Interval is also referred to as a transmit time interval. The TTI in the LTE system (Rel.8 to 12) is also referred to as a sub-frame length.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In a radio communication system (for example, 5G) of LTEs Rel.13 and after LTE Rel.13, it is assumed to perform communication with a high frequency band, for example, tens of GHz, and communication with a relatively small data amount such as Internet of Things (IoT), Machine Type Communication (MTC), and Machine To Machine (M2M). A demand for Device To Device (D2D) and Vehicular To Vehicular (V2V) communication where low-latency communication is required is increasing.

In order to provide sufficient communication service in such a future radio communication system, communication latency reduction has been examined. For example, it has been examined to communicate using a TTI (for example, also referred to as a shortened TTI) such that the Transmission Time Interval (TTI), which is a minimum time unit of scheduling, is reduced to less than 1 ms in the existing LTE system (LTE Rel.8 to 12).

In the existing LTE system, communication timing control is performed in a unit of sub-frame (1 ms). However, when communicating by introducing the shortened TTI, it has not been specified yet how to control transmitting/receiving of signals. Therefore, even when communicating by introducing the shortened TTI, a control method that ensures appropriate communication is necessary.

The present invention has been made in consideration of this point, and an object of the present invention is to provide a user terminal, a radio base station, and a radio communication method that ensure appropriate communication, even when a shortened TTI is applied.

Solution to Problem

One aspect of a user terminal of the present invention is a user terminal that communicates using a first Transmission Time Interval (TTI) and a second TTI whose TTI length is shorter than a TTI length of the first TTI, includes a receiving section that receives an L1/L2 control channel transmitted from a radio base station, and a control section that controls receiving of a first L1/L2 control channel transmitted for each first TTI and a second L1/L2 control channel transmitted at the second TTI.

Advantageous Effects of Invention

The present invention can appropriately communicate, even when a shortened TTI is applied.

BRIEF DESCRIPTION OF DRAWINGS

FIG. 3A and FIG. 3B are drawings illustrating exemplary configuration of the shortened TTI.

FIG. 4A to FIG. 4C are drawings illustrating exemplary configurations of the normal TTI and the shortened TTI.

FIG. 8A to FIG. 8C are drawings illustrating an exemplary transmitting method of a DL channel for the shortened TTI according to an embodiment.

FIG. 10A and FIG. 10B are drawings illustrating another exemplary transmitting method of the DL channel for the shortened TTI according to the embodiment.

FIG. 13A and FIG. 13B are drawings illustrating another exemplary transmitting method of the DL channel for the shortened TTI according to the embodiment.

DESCRIPTION OF EMBODIMENTS

Figure 1:
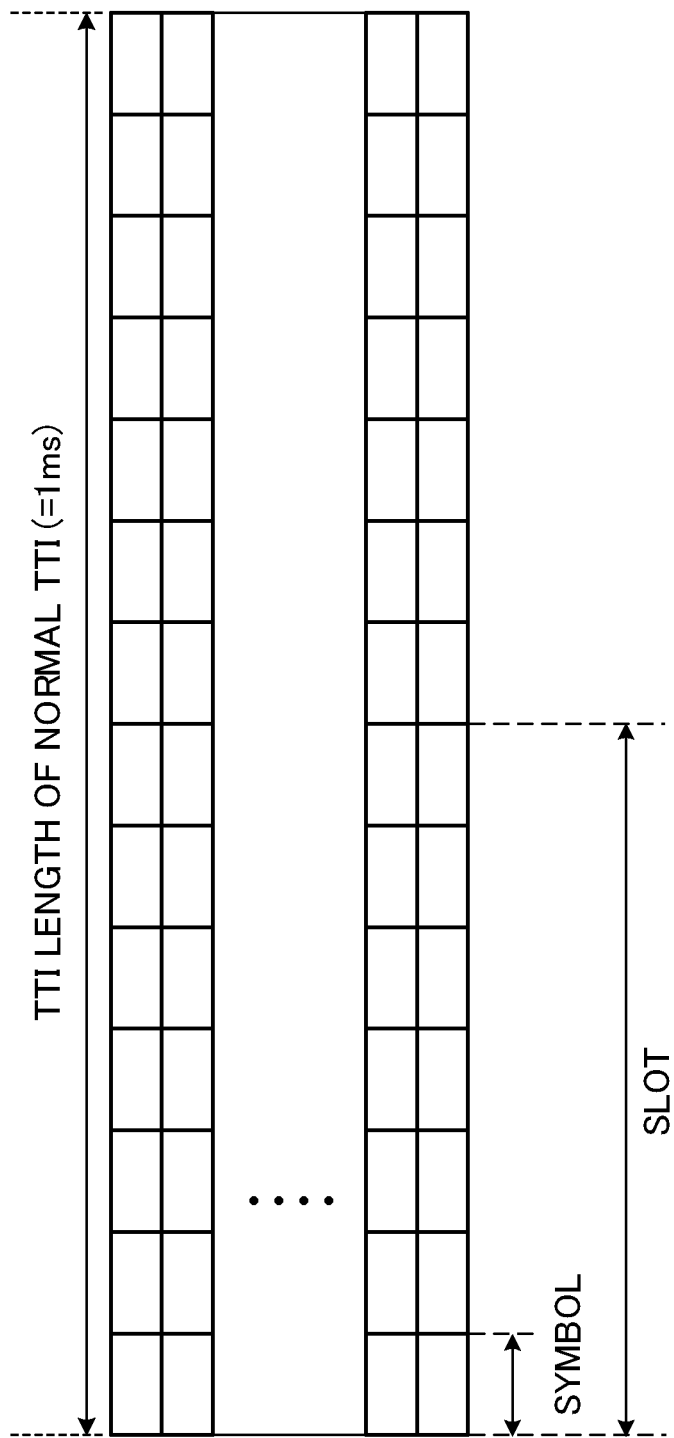
FIG. 1 is a drawing illustrating an exemplary Transmission Time Interval (TTI) in an existing LTE system (Rel.8 to 12).

FIG. 1 is an explanatory drawing of an exemplary Transmission Time Interval (TTI) in an existing system (LTE Rel.8 to 12). As illustrated in FIG. 1, the TTI (hereinafter referred to as a "normal TTI") in LTE Rel.8 to 12 has a time length of 1 ms. The normal TTI, which is also referred to as a sub-frame, is constituted of two time slots. The TTI, which is a transmission time unit of a channel-coded one data packet (transport block), will be a processing unit of, for example, scheduling and Link Adaptation.

As illustrated in FIG. 1, in a case of a normal Cyclic Prefix (CP) in a downlink (DL), the normal TTI is constituted including 14 Orthogonal Frequency Division Multiplexing (OFDM) symbols (seven OFDM symbols per slot). Each OFDM symbol has a time length (symbol length) of 66.7 μs, and a normal CP of 4.76 μs is added. The symbol length and a subcarrier spacing have a reciprocal relationship with one another. Thus, when the symbol length is 66.7 μs, the subcarrier spacing is 15 kHz.

In a case of the normal Cyclic Prefix (CP) in an uplink (UL), the normal TTI is constituted including 14 Single Carrier Frequency Division Multiple Access (SC-FDMA) symbols (seven SC-FDMA symbols per slot). Each SC-FDMA symbol has a time length (symbol length) of 66.7 μs, and a normal CP of 4.76 μs is added. The symbol length and a subcarrier spacing have a reciprocal relationship with one another. Thus, when the symbol length is 66.7 μs, the subcarrier spacing is 15 kHz.

In a case of an extended CP, the normal TTI may be constituted including 12 OFDM symbols (or 12 SC-FDMA symbols). In this case, each OFDM symbol (or each SC-FDMA symbol) has a time length of 66.7 μs, and an extended CP of 16.67 μs is added.

On the other hand, in a future radio communication system such as LTEs of Rel.13 and after Rel.13, and 5G a radio interface appropriate for a high frequency band, for example, tens of GHz, and a radio interface that minimizes latency, for Internet of Things (IoT), Machine Type Communication (MTC), Machine To Machine (M2M), Device To Device (D2D), and Vehicular To Vehicular (V2V) services, are preferred.

Figure 2:
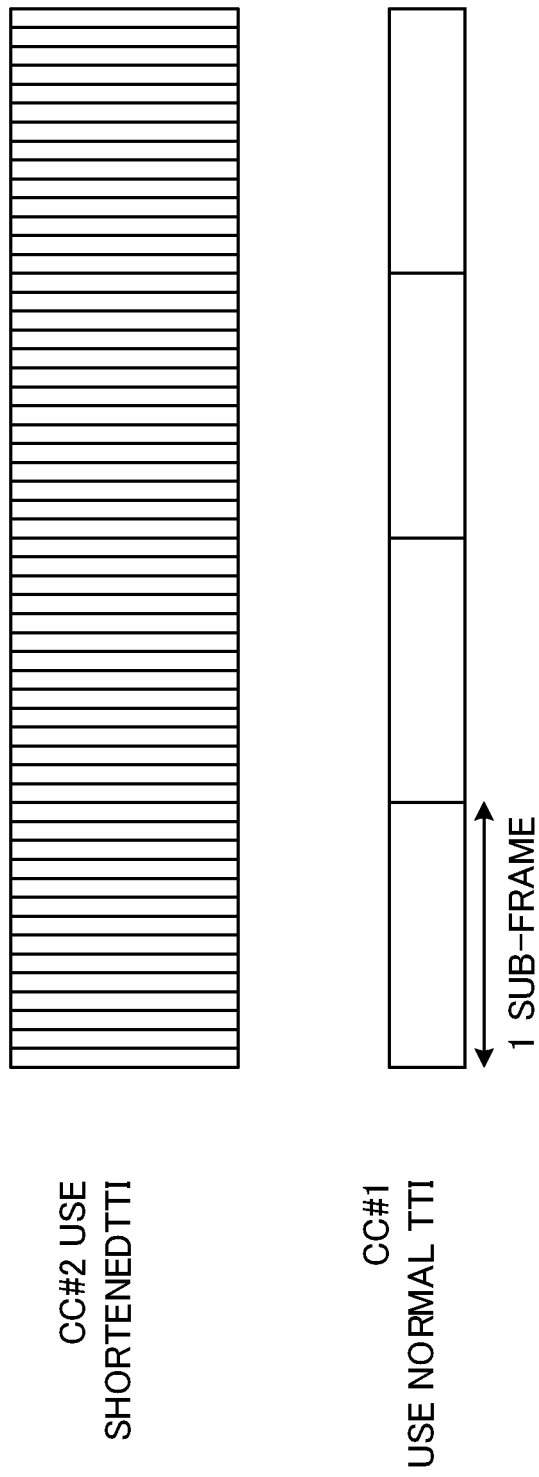
FIG. 2 is a drawing describing a normal TTI and a shortened TTI.

Therefore, in the future communication system, it is considered to communicate using a shortened TTI whose TTI is shortened to less than 1 ms (see FIG. 2). FIG. 2 illustrates a cell (CC #1) that uses the normal TTI (1 ms) and a cell (CC #2) that uses the shortened TTI. When using the shortened TTI, it is considered to change the subcarrier spacing from that of the subcarrier of the normal TTI (for example, to expand the subcarrier spacing).

When using a TTI (hereinafter referred to as the "shortened TTI") whose time length is shorter than that of the normal TTI, a time margin with respect to a process (for example, coding and decoding) at a user terminal and a radio base station increases, thus ensuring a processing latency reduction. Using the shortened TTI can increase the number of user terminals accommodated for its unit time (for example, 1 ms). The following describes configuration and the like of the shortened TTI.

(Exemplary Configuration of Shortened TTI)

A description will be given of exemplary configuration of the shortened TTI with reference to FIG. 3. As illustrated in FIG. 3A and FIG. 3B, the shortened TTI has a time length (TTI length) shorter than 1 ms. The shortened TTI may have one or more TTI lengths whose multiples are 1 ms, for example, 0.5 ms, 0.25 ms, 0.2 ms, and 0.1 ms. Alternatively, since the normal TTI includes 14 symbols in the case of the normal CP, the shortened TTI may have one or more TTI lengths whose multiples are 1/14 ms, for example, 7/14 ms, 4/14 ms, 3/14 ms, and 1/14 ms. Since the normal TTI includes 12 symbols in the case of the extended CP, the shortened TTI may have one or more TTI lengths whose multiples are 1/12 ms, for example, 6/12 ms, 4/12 ms, 3/12 ms, and 1/12 ms. Also in the shortened TTI, similarly to the previous LTE, it can be configured whether the normal CP or the extended CP by notification information and an upper layer signaling such as RRC signaling. This can introduce the shortened TTI while keeping compatibility (synchronization) with the normal TTI, which is 1 ms.

In FIG. 3A and FIG. 3B, the case of the normal CP is described as one example. However, the configuration is not limited to this. The shortened TTI may have a time length shorter than that of the normal TTI. The configuration such as the number of symbols, a symbol length, and a CP length in the shortened TTI may be any configuration. The following describes an example that uses the OFDM symbol for the DL and the SC-FDMA symbol for the UL. However, the configuration is not limited to these.

FIG. 3A is a drawing illustrating first exemplary configuration of the shortened TTI. As illustrated in FIG. 3A, in the first exemplary configuration, the shortened TTI is constituted of 14 OFDM symbols (or SC-FDMA symbols) as many as those of the normal TTI. Each OFDM symbol (each SC-FDMA symbol) has a symbol length shorter than the symbol length (=66.7 μs) of the normal TTI.

As illustrated in FIG. 3A, when shortening the symbol length with maintaining the number of the symbols of the normal TTI, physical layer signal configuration (for example, RE arrangement) of the normal TTI can be diverted. When maintaining the number of the symbols of the normal TTI, the shortened TTI also can include information volume (bit volume) identical to that of the normal TTI. Meanwhile, since a symbol time length is different from that of the symbol of the normal TTI, it becomes difficult to frequency-multiplex the signal of the shortened TTI illustrated in FIG. 3A and the signal of the normal TTI, within an identical system band (alternatively, cell or CC).

Since the symbol length and the subcarrier spacing have the reciprocal relationship with one another, when shortening the symbol length as illustrated in FIG. 3A, the subcarrier spacing becomes wider than 15 kHz of the normal TTI. The widened subcarrier spacing can effectively reduce inter-channel interference due to Doppler shift in movement of the user terminal, and transmission quality deterioration due to phase noise of a receiver of the user terminal. Especially, in the high frequency band, for example, tens of GHz, the widened subcarrier spacing can effectively reduce the transmission quality deterioration.

FIG. 3B is a drawing illustrating second exemplary configuration of the shortened TTI. As illustrated in FIG. 3B, in the second exemplary configuration, the shortened TTI is constituted of the OFDM symbols (or SC-FDMA symbols) whose number is smaller than that of the normal TTI. Each OFDM symbol (each SC-FDMA symbol) has a symbol length (=66.7 μs) identical to that of the normal TTI. In this case, the shortened TTI can be constituted in symbol units in the normal TTI. For example, the shortened TTI can be constituted using a part of symbols among 14 symbols included in one sub-frame. In FIG. 3B, the shortened TTI is constituted of seven OFDM symbols (SC-FDMA symbols), which is a half of those of the normal TTI.

As illustrated in FIG. 3B, when reducing the number of the symbols with maintaining the symbol length, the information volume (bit volume) included in the shortened TTI can be shortened compared with the normal TTI. In view of this, the user terminal can perform a receiving process (for example, demodulating and decoding) of information included in the shortened TTI in a period shorter than that of the normal TTI to ensure shortening the process latency. This can frequency-multiplex the signal of the shortened TTI illustrated in FIG. 3B and the signal of the normal TTI within the identical system band (alternatively, cell or CC) to ensure maintaining the compatibility with the normal TTI.

(Exemplary Configuration of Shortened TTI)

A description will be given of an exemplary configuration of the shortened TTI. When applying the shortened TTI, so as to have compatibility with the existing system (LTE Rel.8 to 12), it is also possible to configure both of the normal TTI and the shortened TTI at the user terminal. FIG. 4 are drawings illustrating exemplary configurations of the normal TTI and the shortened TTI. FIG. 4 are only examples, and the configuration is not limited to these.

FIG. 4A is a drawing illustrating a first exemplary configuration of the shortened TTI. As illustrated in FIG. 4A, the normal TTI and the shortened TTI may temporally mix within an identical Component Carrier (CC) (frequency domain). Specifically, the shortened TTI may be configured at specific sub-frames (alternatively, specific radio frames) in the identical CC. For example, in FIG. 4A, the shortened TTI is configured at continuous five sub-frames, and the normal TTI is configured at other sub-frames, in the identical CC. For example, the specific sub-frame may be a sub-frame at which an MBSFN sub-frame can be configured and a sub-frame including (or not including) a specific signal such as an MIB and a synchronization channel. The number and a position of the sub-frame at which the shortened TTI is configured are not limited to those illustrated in FIG. 4A.

FIG. 4B is a drawing illustrating a second exemplary configuration of the shortened TTI. As illustrated in FIG. 4B, Carrier Aggregation (CA) or Dual Connectivity (DC) may be performed by aggregating the CC of the normal TTI and the CC of the shortened TTI. Specifically, the shortened TTI may be configured at a specific CC (More specifically, at the DL and/or the UL of the specific CC). For example, in FIG. 4B, the shortened TTI is configured at the DL of the specific CC, and the normal TTI is configured at the DL and the UL of other CCs. The number and a position of the CC at which the shortened TTI is configured are not limited to those illustrated in FIG. 4B.

In a case of the CA, the shortened TTI may be configured at a specific CC (a primary (P) cell and/or a secondary (S) cell) in an identical radio base station. On the other hand, in a case of the DC, the shortened TTI may be configured at a specific CC (a P cell and/or an S cell) in a master cell group (MCG) formed by a first radio base station, and may be configured at a specific CC (a primary secondary (PS) cell and/or an S cell) in a secondary cell group (SCG) formed by a second radio base station.

FIG. 4C is a drawing illustrating a third exemplary configuration of the shortened TTI. As illustrated in FIG. 4C, the shortened TTI may be configured at any of the DL and the UL. For example, FIG. 4C illustrates a case where the normal TTI is configured at the UL, and the shortened TTI is configured at the DL, in a TDD system.

Specific channel and signal of the DL or the UL may be allocated to (configured at) the shortened TTI. For example, a Physical Uplink Control Channel (PUCCH) may be allocated to the normal TTI, and a Physical Uplink Shared Channel (PUSCH) may be allocated to the shortened TTI. For example, in this case, the user terminal performs PUCCH transmission at the normal TTI, and performs PUSCH transmission at the shortened TTI.

A multiple access system different from the OFDM (or SC-FDMA), which is a multiple access system of LTE Rel.8 to 12, may be allocated to (configured at) the shortened TTI.

(Exemplary Notification of Shortened TTI)

As described above, when configuring the cell that uses the shortened TTI with respect to the user terminal, the user terminal can configure (and/or detect) the shortened TTI based on implicit or explicit notification from the radio base station. The following describes a case of (1) the implicit notification, or a case of the explicit notification according to at least one of (2) the notification information or the Radio Resource Control (RRC) signaling, (3) Medium Access Control (MAC) signaling, and (4) Physical (PHY) signaling, for the exemplary notification of the shortened TTI applicable for the embodiment.

In the case of (1) the implicit notification, the user terminal may configure the shortened TTI (determine that, for example, the cell, the channel, and the signal that communicate are the shortened TTIs), based on, for example, the frequency band (for example, a band for 5G and an unlicensed band), the system bandwidth (for example, 100 MHz), applying or not of Listen Before Talk (LBT) in a License Assisted Access (LAA), a type of data to be transmitted (for example, control data and audio), a logical channel, the transport block, a Radio Link Control (RLC) mode, and a Cell-Radio. Network Temporary Identifier (C-RNTI).

When detecting control information (DCI) addressed to own terminal with a PDCCH mapped to beginning one, two, three, or four symbols of the normal TTI and/or an EPDCCH of 1 ms, 1 ms including these PDCCH/EPDCCH may be determined as the normal TTI. When detecting the control information (DCI) addressed to own terminal with PDCCH/EPDCCH that have other configuration (for example, a PDCCH mapped to symbols except for the beginning one to four symbols of the normal TTI and/or an EPDCCH less than 1 ms), a predetermined time division less than 1 ms including these PDCCH/EPDCCH may be determined as the shortened TTI. Here, the detection of the control information (DCI) addressed to own terminal can be performed based on a CRC check result with respect to the blind-decoded DCI.

In the case of (2) the notification information or the RRC signaling, the shortened TTI may be configured based on configuration information notified to the user terminal from the radio base station (for example, a first cell) by the notification information or the RRC signaling. This configuration information indicates, for example, information regarding the CC and/or the sub-frame that uses the shortened TTI, information regarding the channel and/or the signal that uses the shortened TTI, and information regarding the TTI length of the shortened TTI. The user terminal configures the shortened TTI to be semi-static based on the configuration information from the radio base station. Mode switching of the shortened TTI and the normal TTI may be performed in an RRC Reconfiguration procedure, and may be performed in an Intra-cell handover (HO) in the P cell, and in a CC (S cell) removal/addition procedure in the S cell.

In the case of (3) the MAC signaling, the MAC signaling may activate or de-activate the shortened TTI configured based on the configuration information notified by the RRC signaling. Specifically, the user terminal activates or de-activates the shortened TTI based on an MAC control element from the radio base station. The user terminal may de-activate the shortened TTI when a timer, which indicates an activating period of the shortened TTI by the upper layer signaling such as the RRC, is preliminarily set, and the UL/DL allocation of the shortened TTI has not been performed in a predetermined period after activating the shortened TTI by an L2 control signal. Such shortened-TTI-de-activating-timer may count with the normal TTI (1 ms) as a unit, and may count with the shortened TTI (for example, 0.25 ms) as a unit.

When switching the mode of the shortened TTI and the normal TTI at the S cell, the S cell may be once de-activated, and may be considered that a Timing Advance (TA) timer has be expired. This ensures disposing a communication stop period in the mode switching.

In the case of (4) the PHY signaling, the PHY signaling may schedule the shortened TTI configured based on the configuration information notified by the RRC signaling. Specifically, the user terminal detects the shortened TTI based on information included in received and detected Physical Downlink Control Channel (Physical Downlink Control Channel (PDCCH) or Enhanced Physical Downlink Control Channel (EPDCCH), hereinafter referred to as PDCCH/EPDCCH).

For example, it is assumed that the control information (DCI) that allocates the transmitting or the receiving at the normal TTI and the shortened TTI includes different information elements. (4-1) When detecting the control information (DCI) including the information element that allocates the transmitting/receiving at the shortened TTI, the user terminal may recognize a predetermined time division including a timing where the PDCCH/EPDCCH is detected, as the shortened TTI. In the PDCCH/EPDCCH, the user terminal can blind-decode the control information (DCI) that allocates the transmitting or the receiving of both of the normal TTI and the shortened TTI. Alternatively, (4-2) when detecting the control information (DCI) including the information element that allocates the transmitting/receiving at the shortened TTI, the user terminal may recognize a predetermined time division including a timing where a PDSCH or a PUSCH scheduled by (Downlink Control Information (DCI) transmitted by) this PDCCH/EPDCCH is transmitted/received, as the shortened TTI. Alternatively, (4-3) when detecting the DCI including the information element that allocates the transmitting/receiving at the shortened TTI, the user terminal may recognize a predetermined time division including a timing that transmits or receives retransmission control information (also referred to as Hybrid Automatic Repeat reQuest-Acknowledgement (HARQ-ACK), ACK/NACK, and A/N) with respect to the PDSCH or the PUSCH scheduled by (the DCI transmitted by) this PDCCH/EPDCCH, as the shortened TTI.

When detecting the shortened TTI based on the information included in the Physical Downlink Control Channel, the control information (DCI) that instructs the transmitting/receiving at the shortened TTI may be transmitted/received before a certain period of time of the transmitting/receiving of the shortened TTI. That is, the radio base station transmits the control information (DCI) that instructs the transmitting/receiving at the shortened TTI at a predetermined timing. After receiving this control information (DCI), the user terminal transmits/receives the shortened TTI after a predetermined period (for example, after a period with an integral multiple of the TTI length or after a period with an integral multiple of the sub-frame length). For the shortened TTI and the normal TTI, appropriate signal processing algorithm (for example, channel estimation and error correction decoding) may be different. Thus, transmitting/receiving the control information (DCI) that instructs the transmitting/receiving at the shortened TTI before the predetermined period of time actually transmitting/receiving at the shortened TTI ensures a period that the user terminal changes the signal processing algorithm.

When the shortened TTI is configured with the upper layer signaling such as the RRC, and then the instruction of the control information (DCI) to be transmitted/received is performed in the Physical Downlink Control Channel, a method that switches to the transmitting/receiving at the normal TTI may be applied. Generally, the shortened TTI for which the signal process at low latency is required necessitates user processing capacity higher than that of the normal TTI. Accordingly, limiting dynamic switching from the shortened TTI to the normal TTI ensures reducing signal processing load of the user terminal in accordance with change of the TTI length, compared with a case that allows the dynamic switching from the normal TTI to the shortened TTI.

The user terminal may detect the shortened TTI based on a state (for example, an Idle state or a Connected state) of the user terminal. For example, in the case of the Idle state, the user terminal may recognize all the TTIs as the normal TTIs to blind-decode only the PDCCHs included in the beginning one to four symbols of the normal TTI of 1 ms. In the case of the Connected state, the user terminal may configure (and/or detect) the shortened TTI based on at least one of the above-described notification examples (1) to (4).

As described above, in the future radio communication, it is assumed that the communication is performed by applying the shortened TTI whose Transmission Time Interval is shortened than that of the normal TTI to the UL transmission and/or the DL transmission. Meanwhile, in the existing LTE system, communication timing and allocation control is performed in a unit of sub-frame (1 ms). The following describes an allocation method of an L1/L2 control signal in the existing system.

As the L1/L2 control channel (L1/L2 control signal) in the existing system, a Physical Control Format Indicator Channel (PCFICH), a Physical Hybrid-ARQ Indicator Channel (PHICH), and a Physical Downlink Control Channel (Physical Downlink Control Channel (PDCCH) and Enhanced Physical Downlink Control Channel (EPDCCH)) are specified.

Figure 5:
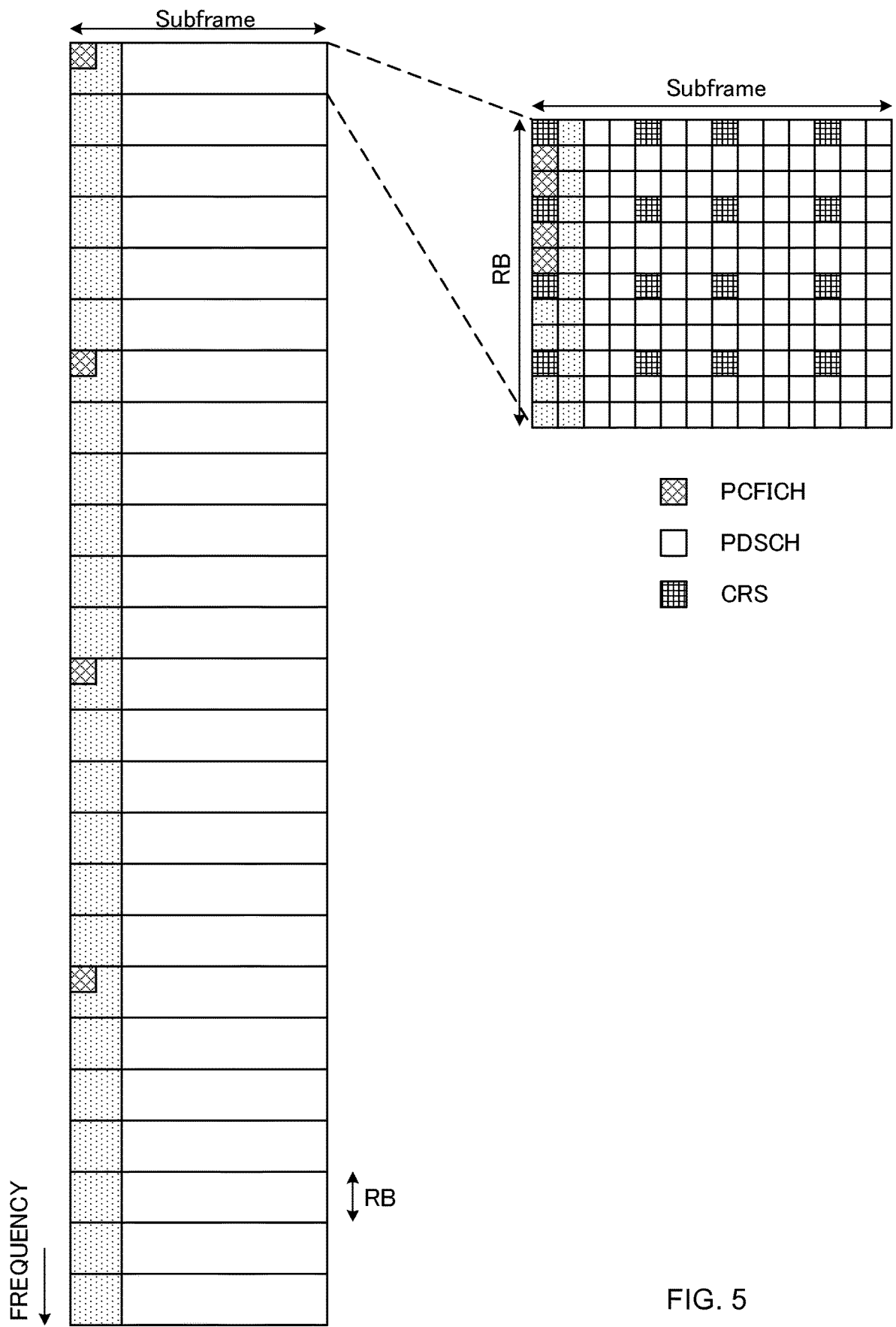
FIG. 5 is a drawing illustrating exemplary PCFICH mapping in the existing system.

In the existing system, the PCFICH is used for notification of the number of OFDM symbols used for the PDCCH (or a beginning symbol of the PDSCH) to be mapped to only a beginning OFDM symbol of the sub-frame (see FIG. 5). The PCFICH is arranged in the system band using four Resource Element Groups (REGs). The radio base station notifies the number of the OFDM symbols (Control Format Indicator (CFI)) where the PDCCH is allocated at each sub-frame as information of 2 bits to the user terminal using the beginning OFDM symbol of the sub-frame.

Figure 6A:
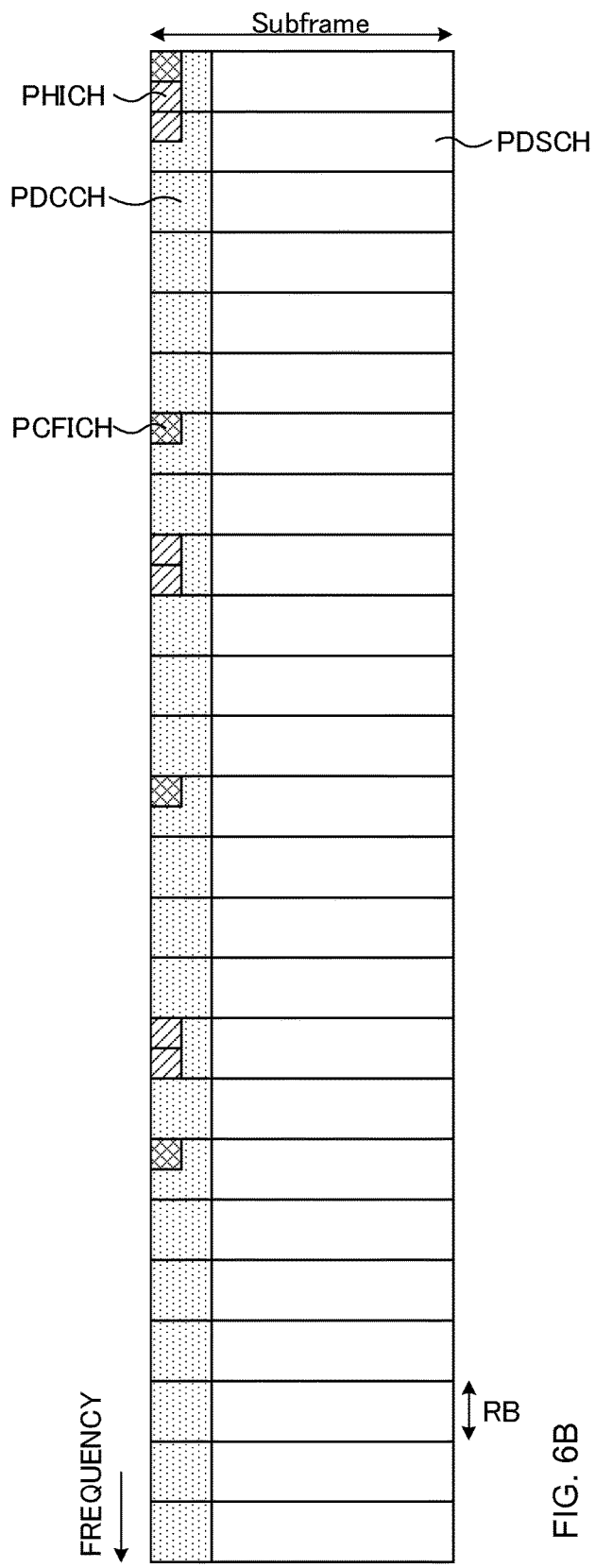
FIG. 6A and FIG. 6B are drawings illustrating exemplary PHICH and PDCCH mapping in the existing system.
Figure 6B:
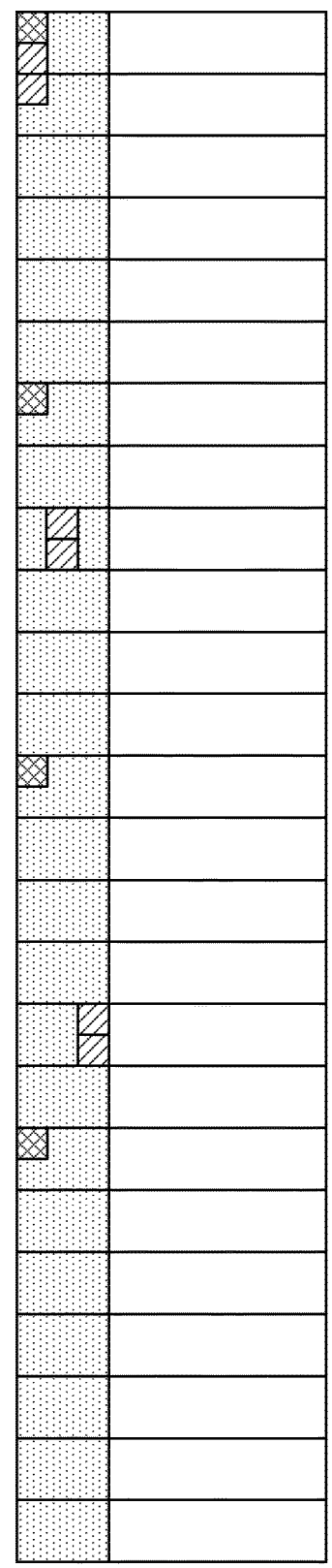

In the existing system, the PHICH is used for notification of delivery confirmation information (ACK/NACK) with respect to the UL transmission (for example, the PUSCH) to be mapped to only the beginning OFDM symbol or the one to three OFDM symbols of the sub-frame (see FIG. 6A). Radio resource volume of the PHICH is notified to the user terminal in a broadcast channel. Specifically, information regarding the number of the symbols at which the PHICH is multiplexed is notified to the user terminal with information of 1 bit (PHICH duration). Information regarding the number of groups of the PHICH is notified to the user terminal with information of 2 bits (PHICH radio resource). FIG. 6B illustrates a case where the number of the PHICH groups is two.

In the existing system, the Physical Downlink Control Channel (PDCCH) is used for notification of, for example, scheduling of the DL and the UL to be mapped to resource to which the PCFICH/PHICH is not allocated, in the beginning one to three (or one to four) symbols of the sub-frame (see FIG. 6). Based on a search space configured in the PDCCH for each user terminal, the radio base station disposes the downlink control information at this search space to transmit.

Figure 7:
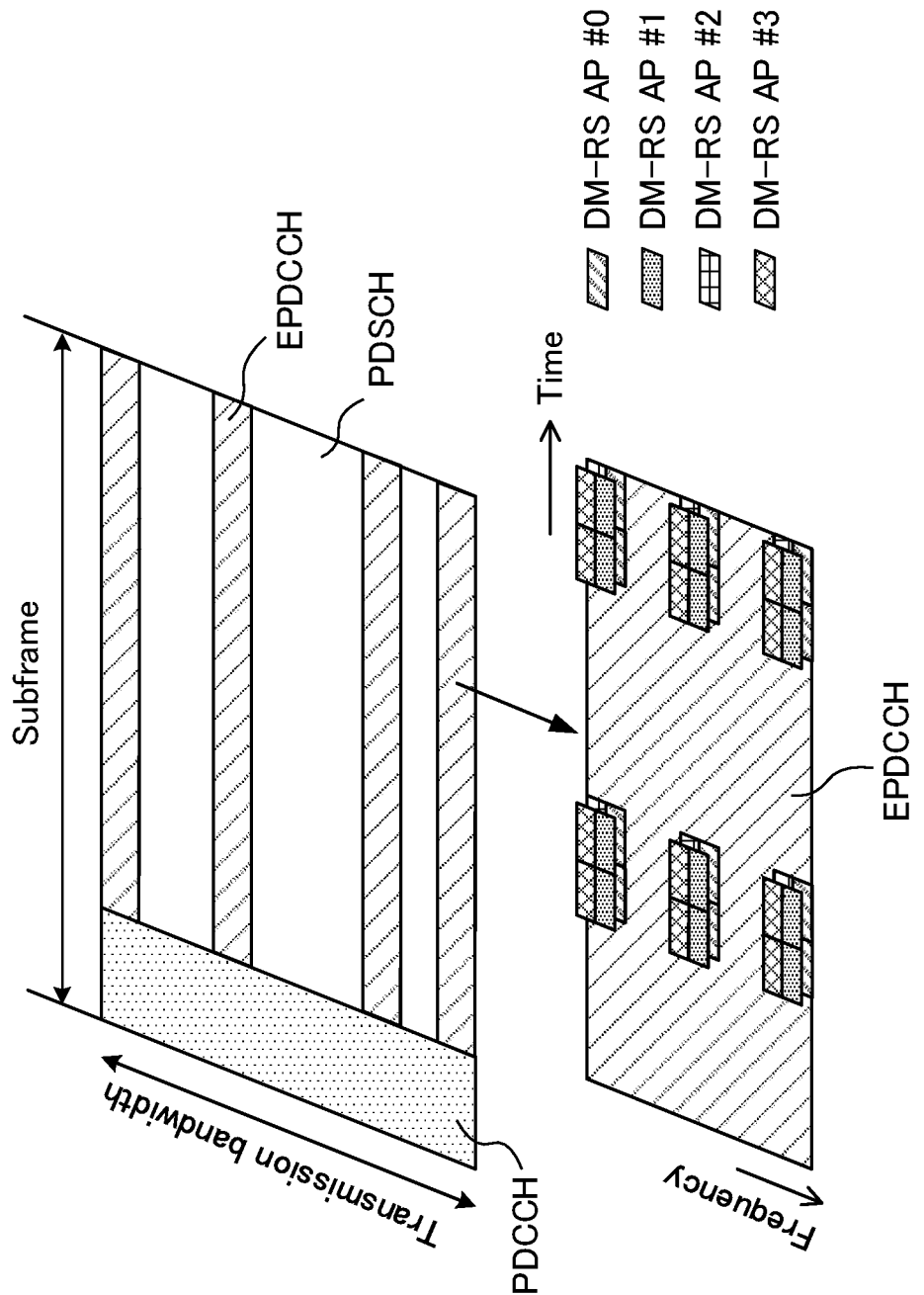
FIG. 7 is a drawing illustrating exemplary EPDCCH mapping in the existing system.

In the existing system, the Enhanced Physical Downlink Control Channel (EPDCCH) is used for notification of, for example, the scheduling of the DL and the UL to be frequency-division-multiplexed with a region of the Physical Downlink Shared Channel (PDSCH) (see FIG. 7). In a resource region (for example, a predetermined PRB) to which the EPDCCH is allocated, a Demodulation Reference Signal (DM-RS) is supported, and user-specific Beam Forming can be applied to the EPDCCH.

The user terminal, in receiving of the PCFICH, the PHICH, and the PDCCH, performs the channel estimation and demodulation using a Cell-specific Reference Signal (CRS). When using a plurality of antenna ports, transmission diversity by Space-Frequency Block Coding (SFBC) is applied to the PCFICH, the PHICH, and the PDCCH. When using the plurality of antenna ports with respect to the EPDCCH, Non-codebook pre-coding by the Demodulation Reference Signal (DM-RS) is applied.

Thus, in the communication using the normal TTI in the existing system, the allocation of the L1/L2 control channel is controlled based on a predetermined rule for each normal TTI (one sub-frame). Meanwhile, when communicating by introducing the shortened TTI, it has not been specified yet how to control transmitting/receiving and allocation of the signal (for example, L1/L2 control channel) for the shortened TTI.

For example, an embodiment that allocates signals each transmitted at a plurality of TTIs whose TTI lengths are different, to an identical frequency domain to control is also considered. As one example, a case where a frequency domain to which a DL signal transmitted for each normal TTI is allocated, and a frequency domain to which a DL signal transmitted at the shortened TTI is allocated overlap is considered. In this case, there is a problem how to control the allocation of the DL signals (for example, the L1/L2 control channels) of the respective TTIs and the transmitting/receiving at the user terminal and the like.

Therefore, the inventors have conceived to configure a DL channel for the shortened TTI separately from the DL channel for the normal TTI, as one aspect of the embodiment. For example, considering an allocation position and the like of the DL channel for the normal TTI, allocation of the DL channel for the shortened TTI is controlled.

The user terminal at which the shortened TTI is configured can have configuration that receives the L1/L2 control channel for each shortened TTI to control the DL receiving and/or the UL transmitting. In this case, this user terminal receives the L1/L2 control signal (for example, the L1/L2 control signal in the existing system) transmitted for each normal TTI and the L1/L2 control signal transmitted at the shortened TTI. Meanwhile, the user terminal at which the shortened TTI is not configured can have configuration that receives the L1/L2 control signal transmitted for each normal TTI and does not receive the L1/L2 control signal transmitted at the shortened TTI.

The following describes the embodiment in detail. The embodiment may be applied to all the PCFICH, the PHICH, the PDCCH and the EPDCCH, and may be applied to a part of them, in the L1/L2 control signal. In the following description, the TTI whose TTI length is shorter than 1 ms is referred to as the shortened TTI, however, may be also referred to as a short TTI, a shortened sub-frame, or a short sub-frame. The TTI of 1 ms is referred to as the normal TTI, however, may be also referred to as a normal TTI, a long TTI, a basic sub-frame, a normal sub-frame, or a long sub-frame. The above-described configuration illustrated in FIG. 1 to FIG. 4 can be applied to the shortened TTI of the embodiment.

In the embodiment, the L1/L2 control signal monitored by only the user terminal at which the shortened TTI is configured is referred to as a L1/L2 control signal for the shortened TTI. The L1/L2 control signal specified in the existing system (alternatively, monitored by the user terminal in the existing system) is referred to as an existing L1/L2 control signal. The embodiment can be applied to not only the L1/L2 control signal but also another DL channel as necessary.

In the following description, an LTE system is exemplified. However, the embodiment is not limited to this, and can be applied to insofar as a system using the shortened TTI. A plurality of aspects described in the following may be performed individually, or can be performed in combination as necessary.

(First Aspect)

A first aspect describes an exemplary transmitting/receiving method of the DL channel (for example, the L1/L2 control channel) for the shortened TTI. The L1/L2 control channel for the shortened TTI can be at least any of the PCFICH, the PHICH, the PDCCH, and the EPDCCH.

FIG. 8 illustrates exemplary allocation methods of the L1/L2 control channel. FIG. 8A illustrates an allocation method of the L1/L2 control channel in a case where the TTI is one sub-frame (the existing system). FIGS. 8B and 8C illustrate exemplary allocation methods of the L1/L2 control channel in a case where the shortened TTI is applied. FIG. 8B illustrates a case where the shortened TTI is 0.5 ms, and FIG. 8C illustrates a case where the shortened TTI is 0.25 ms. However, the TTI length of the shortened TTI is not limited to these.

The user terminal at which the shortened TTI is configured receives the L1/L2 control channel (all or a part of the PCFICH, the PHICH, the PDCCH, and the EPDCCH) for each shortened TTI (see FIGS. 8B and 8C). This user terminal performs the receiving process (for example, demodulating and decoding) also with respect to existing L1/L2 control information transmitted for each normal TTI (one sub-frame).

That is, the user terminal to which the shortened TTI is applied can receive the existing L1/L2 control channel transmitted for each one sub-frame and the L1/L2 control channel for the shortened TTI transmitted at the shortened TTI. In this case, the shortened TTI including the beginning symbol of the normal TTI can have configuration that does not transmit the L1/L2 control channel for the shortened TTI, and transmits the existing L1/L2 control channel. Obviously, the configuration is not limited to this. The shortened TTI including the beginning symbol of the normal TTI may have configuration that allocates the L1/L2 control channel for the shortened TTI in addition to the existing L1/L2 control channel.

The user terminal (for example, the legacy terminal) that does not communicate using the shortened TTI can have configuration that receives only the existing L1/L2 control channel, and does not receive the L1/L2 control channel for the shortened TTI.

A time domain (for example, the number of the symbols) where the L1/L2 control channel for the shortened TTI is allocated may be variable (for example, one to three or one to four symbols) similarly to the existing L1/L2 control channel (for example, the Physical Downlink Control Channel), and may be securely configured. The time domain and/or the frequency domain where the L1/L2 control channel is allocated to the shortened TTIs included in a predetermined period may be constant. The predetermined period can be the normal TTI (one sub-frame) and one radio frame.

A bandwidth used for transmitting the L1/L2 control channel of the shortened TTI can be configured to a bandwidth different from a system bandwidth (for example, a bandwidth used for transmitting the existing L1/L2 control channel). For example, a bandwidth (a frequency domain) to which the L1/L2 control channel of the shortened TTI is allocated is configured narrower than the system bandwidth. As one example, the bandwidth to which the L1/L2 control channel of the shortened TTI is allocated can be limited to a part of the system band. The bandwidth to which the L1/L2 control channel of the shortened TTI is allocated may have different configuration for each shortened TTI.

The user terminal that performs shortened TTI control selectively receives the L1/L2 control channel for each shortened TTI. The bandwidth of this L1/L2 control channel for each shortened TTI can be configured at the user terminal using the upper layer signaling and the like. Alternatively, it may be constituted to notify to the user terminal using the existing L1/L2 control information.

Figure 9A:
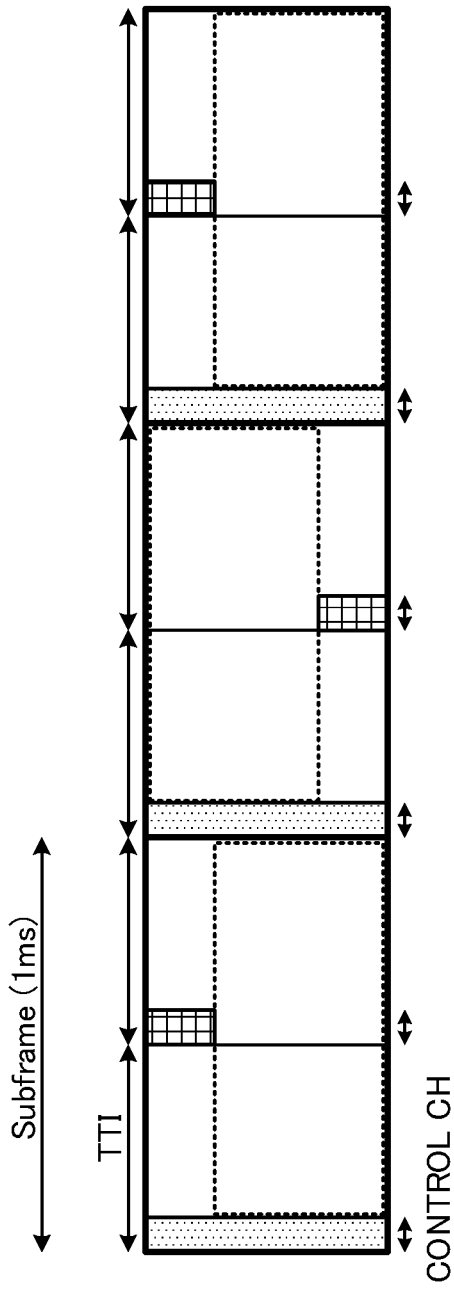
FIG. 9A and FIG. 9B are drawings illustrating another exemplary transmitting method of the DL channel for the shortened TTI according to the embodiment.
Figure 9B:
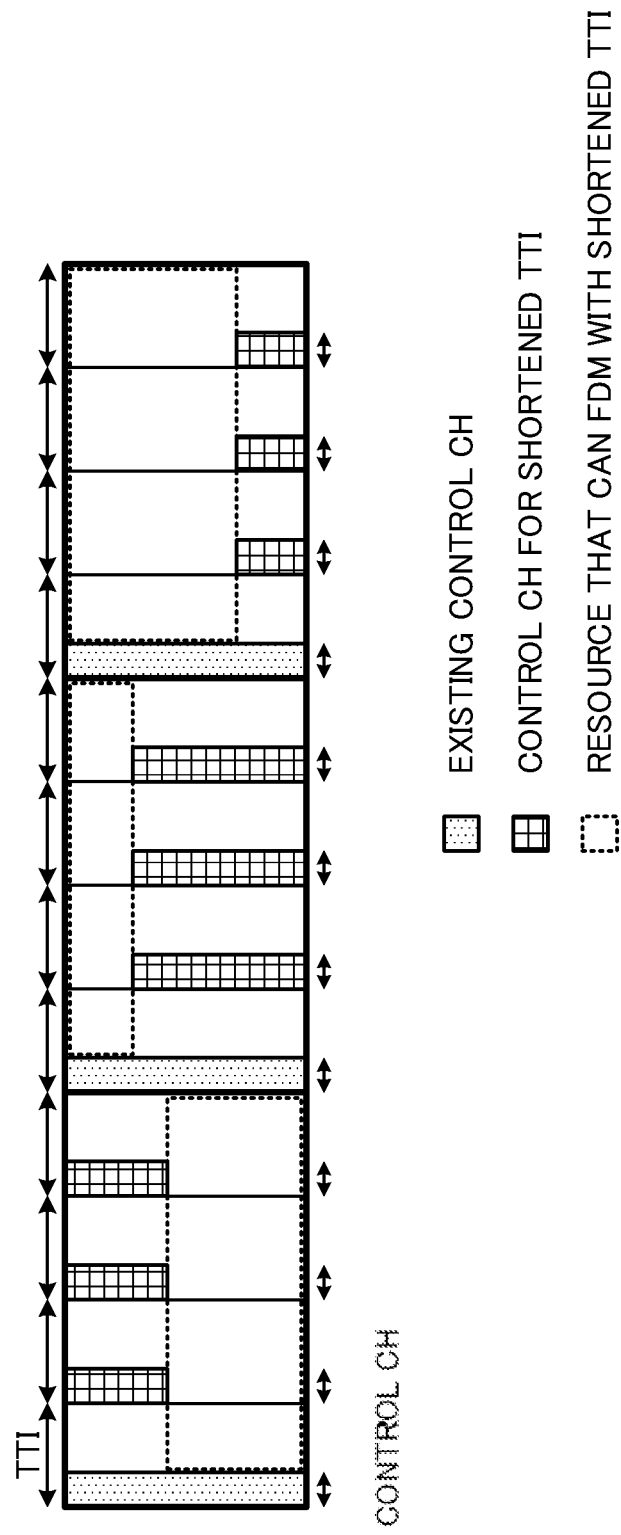

FIG. 9 illustrates a case where the bandwidth to which the L1/L2 control channel for the shortened TTI is allocated is configured narrower than the system bandwidth, and the allocation position and the bandwidth of this L1/L2 control channel are changed by predetermined periods. FIG. 9A illustrates the case where the shortened TTI is 0.5 ms. FIG. 9B illustrates the case where the shortened TTI is 0.25 ms.

FIG. 9A illustrates a case that changes the allocation position of the L1/L2 control channel for the shortened TTI. FIG. 9A illustrates a case that performs hopping of the allocation position of the L1/L2 control channel for the shortened TTI along a frequency direction for each predetermined period (here, sub-frame). The change of the allocation position is not limited to the hopping. It may be constituted to shift (for example, using a predetermined offset) the L1/L2 control channel for the shortened TTI in the frequency direction.

Thus, configuring the DL channel for the shortened TTI exclusively in a part of the frequency domain at at least certain shortened TTI ensures frequency-multiplexing (FDM) of downlink data (for example, the PDSCH) of the normal TTI and the L1/L2 control channel of the shortened TTI. This ensures improving frequency usage efficiency even when allocating the existing DL channel and the DL channel for the shortened TTI.

FIG. 9B illustrates a case that changes the allocation position and the bandwidth of the L1/L2 control channel for the shortened TTI. FIG. 9B illustrates a case that allocates a plurality of L1/L2 control channels for the shortened TTI included in the predetermined period (here, the sub-frame) at identical position and bandwidth, and allocates at different positions and bandwidths between adjacent sub-frames.

Thus, fixing the frequency domain where the L1/L2 control channel can be scheduled between the shortened TTIs, within the predetermined period (for example, the sub-frame) ensures frequency-multiplexing (FDM) of the downlink data (for example, the PDSCH) of the normal TTI and the L1/L2 control channel of the shortened TTI. This ensures improving the frequency usage efficiency even when allocating the existing DL channel and the DL channel for the shortened TTI.

Meanwhile, between the sub-frames, the configuration that can change the frequency domain where the L1/L2 control signal can be scheduled between the shortened TTIs ensures flexible frequency-scheduling with respect to the DL channel of the shortened TTI. Furthermore, the flexible frequency-scheduling can be performed also with respect to the PDSCH of the user terminal (for example, the legacy terminal) that does not communicate using the shortened TTI frequency-division-multiplexed with the DL channel of the shortened TTI.

When the bandwidth of the L1/L2 control channel for the shortened TTI is configured narrower than the system bandwidth, there is a problem how to control the bandwidth of the downlink data and/or uplink data transmitted/received using the shortened TTI. For example, the bandwidth of the downlink data and/or the uplink data transmitted/received using the shortened TTI also can have configuration that controls the allocation within a range of the bandwidth of this L1/L2 control channel for the shortened TTI.

Alternatively, the bandwidth of the downlink data and/or the uplink data transmitted/received using the shortened TTI may have configuration that configures without depending on (limiting to) the bandwidth of this L1/L2 control channel for the shortened TTI (see FIG. 10). FIG. 10 illustrates exemplary cases that allocate the downlink data (for example, the PDSCH) regardless of the bandwidth at which the L1/L2 control channel for the shortened TTI is configured, to a certain user terminal. FIG. 10A illustrates the case where the shortened TTI is 0.5 ms. FIG. 10B illustrates the case where the shortened TTI is 0.25 ms.

As illustrated in FIG. 10, allocating the downlink data and/or the uplink data regardless of the bandwidth at which the L1/L2 control channel for the shortened TTI is configured ensures allocating corresponding to channel quality and the like of the user terminal, and ensures effective usage of radio resource.

(Second Aspect)

A second aspect describes a resource specifying method of the L1/L2 control channel for the shortened TTI.

As described in the first aspect, the frequency and/or time resource to which the L1/L2 control channel for the shortened TTI is allocated can be configured differently from those of the L1/L2 control channel of the existing system. In this case, the user terminal can determine the frequency and/or the time resource of the L1/L2 control channel for the shortened TTI based on predetermined information. As the predetermined information, for example, the existing L1/L2 control channel is available.

Figure 11A:
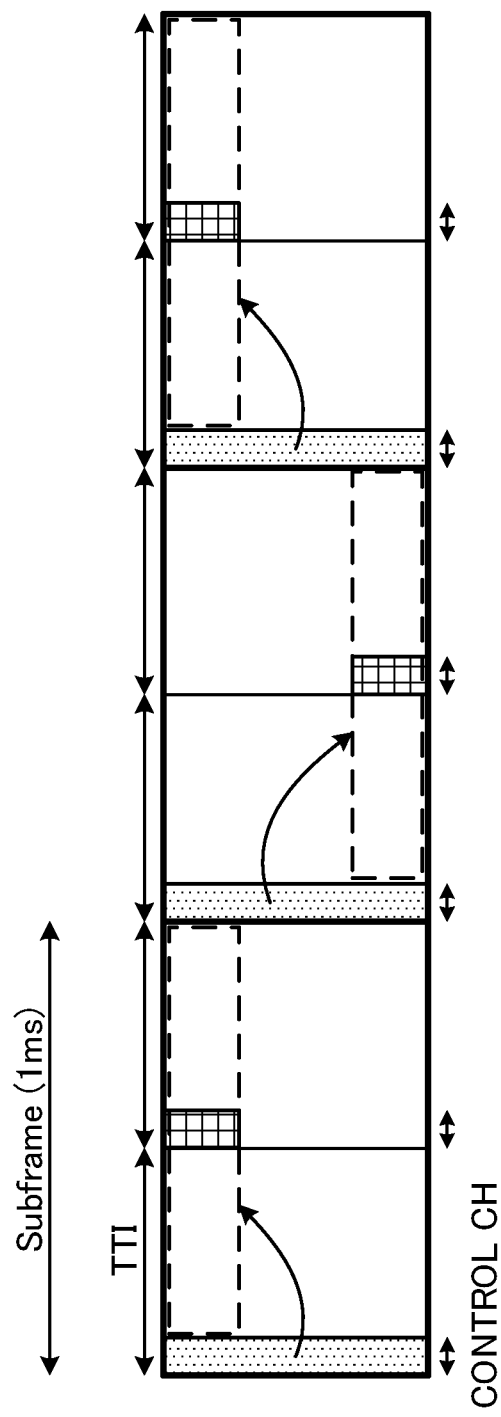
FIG. 11A and FIG. 11B are drawings illustrating another exemplary transmitting method of the DL channel for the shortened TTI according to the embodiment.
Figure 11B:
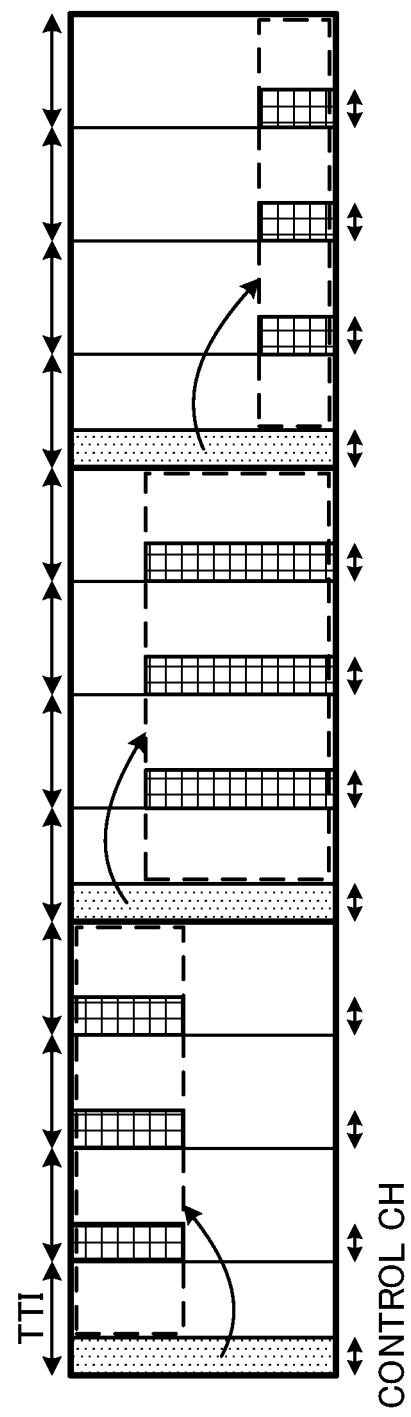

In this case, the user terminal controls receiving of the L1/L2 control channel for the shortened TTI based on the existing L1/L2 control channel mapped to a beginning region (one to three or four symbols) of the sub-frame (the normal TTI) (see FIG. 11). FIG. 11A illustrates the case where the shortened TTI is 0.5 ms. FIG. 11B illustrates the case where the shortened TTI is 0.25 ms.

As illustrated in FIG. 11A and FIG. 11B, information regarding the frequency and/or the time resource of each shortened TTI can be included in the existing L1/L2 control channel transmitted at the sub-frame including this shortened TTI. When including a plurality of L1/L2 control channels for the shortened TTI in one sub-frame, the user terminal can determine the resource of each shortened TTI based on the information included in the existing L1/L2 control channel (see FIG. 11B). When the plurality of L1/L2 control channels for the shortened TTI are configured at an identical resource, the user terminal can perform the receiving process with an assumption that one piece of resource information notified in the existing L1/L2 control channel is applied to the plurality of shortened TTIs.

As the existing L1/L2 control channel that notifies the resource of the L1/L2 control channel for the shortened TTI, for example, the PCFICH and/or the PDCCH is available. Alternatively, combination of these DL channels and the notification of the upper layer signaling is also available.

<PCFICH>

The radio base station can notify the information regarding the frequency and/or the time resource of the L1/L2 control channel for the shortened TTI to the user terminal, using the PCFICH mapped to a region of the existing L1/L2 control channel (see FIGS. 11A and 11B). The user terminal detects the PCFICH in the existing L1/L2 control channel region to determine the resource (for example, the frequency and/or the time resource) to which the L1/L2 control channel for the shortened TTI is mapped, based on a value of this PCFICH. Then, based on the information obtained from the PCFICH, the user terminal performs the receiving process (for example, demodulating and decoding) of the L1/L2 control channel for the shortened TTI.

It is also possible to preliminarily prepare a table that defines a correspondence relation of the value (for example, 2 bits) of the PCFICH and a resource region corresponding to each value, and use it. For example, use of the PCFICH can make configuration that notifies the number of the symbols (the time resource) to which the L1/L2 control channel for the shortened TTI (for example, the PDCCH) is mapped, to the user terminal.

Each value of the PCFICH may have configuration that notifies together the number of the PDCCH symbols for the normal TTI and the resource (for example, the frequency and/or the time resource) to which the L1/L2 control channel for the shortened TTI is mapped, to the user terminal. In this case, the user terminal understands the time resource of the PDCCH mapped to the beginning of the sub-frame, from each value of the PCFICH, and recognizes the resource (for example, the frequency and/or the time resource) to which the L1/L2 control channel for the shortened TTI is mapped, and then, blind-decodes the L1/L2 control channel based on its specification.

The radio base station may notify the time resource (for example, the number of the symbols) of the L1/L2 control channel for the shortened TTI to the user terminal using the PCFICH, and may notify a frequency resource (for example, an allocation position of the bandwidth and/or the frequency) using the upper layer signaling. Alternatively, the radio base station may have configuration that notifies a plurality of frequency and/or time resource candidates of the L1/L2 control channel for the shortened TTI using the upper layer signaling to notify a specific resource candidate to the user terminal for each predetermined timing (for example, sub-frame) using the PCFICH.

The radio base station may notify that there is no resource of the L1/L2 control channel for the shortened TTI (the number of the symbols is zero) in this sub-frame, by a certain value of the PCFICH. For example, when the number of the PDCCH symbols where the PCFICH is mapped to the beginning of this sub-frame is three or four, the radio base station notifies that there is no resource of the L1/L2 control channel for the shortened TTI (the number of the symbols is zero) in this sub-frame. In this case, when determining that the number of the PDCCH symbols mapped to the beginning of this sub-frame by the PCFICH is three or four, the user terminal can skip the blind-decoding of the L1/L2 control channel for the shortened TTI to ensure reducing process load. It may be preliminarily specified or may be configured at an optional value by the upper layer signaling, which value of the PCFICH notifies that there is no resource of the L1/L2 control channel for the shortened TTI (the number of the symbols is zero) in this sub-frame.

<PDCCH>

The radio base station can notify the information regarding the frequency and/or the time resource of the L1/L2 control channel for the shortened TTI to the user terminal, using the PDCCH mapped to the existing L1/L2 control channel region (see FIGS. 11A and 11B). The user terminal detects the PDCCH in the existing L1/L2 control channel region, and then determines the frequency and/or the time resource to which the L1/L2 control channel for the shortened TTI is mapped, based on this PDCCH. Then, based on the information obtained from the PDCCH, the user terminal performs the receiving process (for example, demodulating and decoding) of the L1/L2 control channel for the shortened TTI.

The CRC of the PDCCH that notifies the information regarding the frequency and/or the time resource of the L1/L2 control channel for the shortened TTI to the user terminal can have configuration that is masked by the C-RNTI configured at this user terminal to be mapped to a user specific search space of the PDCCH. Alternatively, this CRC of the PDCCH may have configuration that is masked by another RNTI commonly configured at a plurality of user terminals to be mapped to a common search space of the PDCCH. Making the RNTI common in the user terminals to be mapped to the common search space of the PDCCH eliminates the need to individually control by users to ensure recommending overhead of the signaling.

It is also possible to preliminarily prepare a table that defines a correspondence relation of a value that indicates the resource included in the PDCCH and a resource region corresponding to each value, and use it. For example, use of the PDCCH can make configuration that notifies the number of the symbols (the time resource) to which the L1/L2 control channel for the shortened TTI (for example, the PDCCH) is mapped, to the user terminal.

The radio base station may notify the time resource (for example, the number of the symbols) of the L1/L2 control channel for the shortened TTI to the user terminal using the PDCCH, and may notify the frequency resource (for example, the allocation position of the bandwidth and/or the frequency) using the upper layer signaling. Alternatively, the radio base station may have configuration that notifies the plurality of frequency and/or time resource candidates of the L1/L2 control channel for the shortened TTI using the upper layer signaling, and notifies a specific resource candidate to the user terminal for each predetermined timing (for example, sub-frame) using the PDCCH.

The radio base station may additionally configure identification information (Radio Network Temporary Identifier (RNTI)), a transmission cycle, transmission timing, and the like, which are applied to the Physical Downlink Control Channel (PDCCH) that specifies the resource of the L1/L2 control channel for the shortened TTI, at the user terminal. For example, the radio base station notifies the information including any of the RNTI, the transmission cycle, and the transmission timing, of the PDCCH to the user terminal by the upper layer signaling. The user terminal can perform the receiving process of a predetermined PDCCH based on the information received from the radio base station.

The radio base station may notify the information regarding the frequency and/or the time resource of the L1/L2 control channel for the shortened TTI using the EPDCCH, instead of the PDCCH or in addition to the PDCCH, to the user terminal.

Above-described FIG. 11 illustrates the case that notifies the resource of the L1/L2 control channel for the shortened TTI to the user terminal using the existing L1/L2 control channel of each sub-frame. However, the embodiment is not limited to this.

Figure 12A:
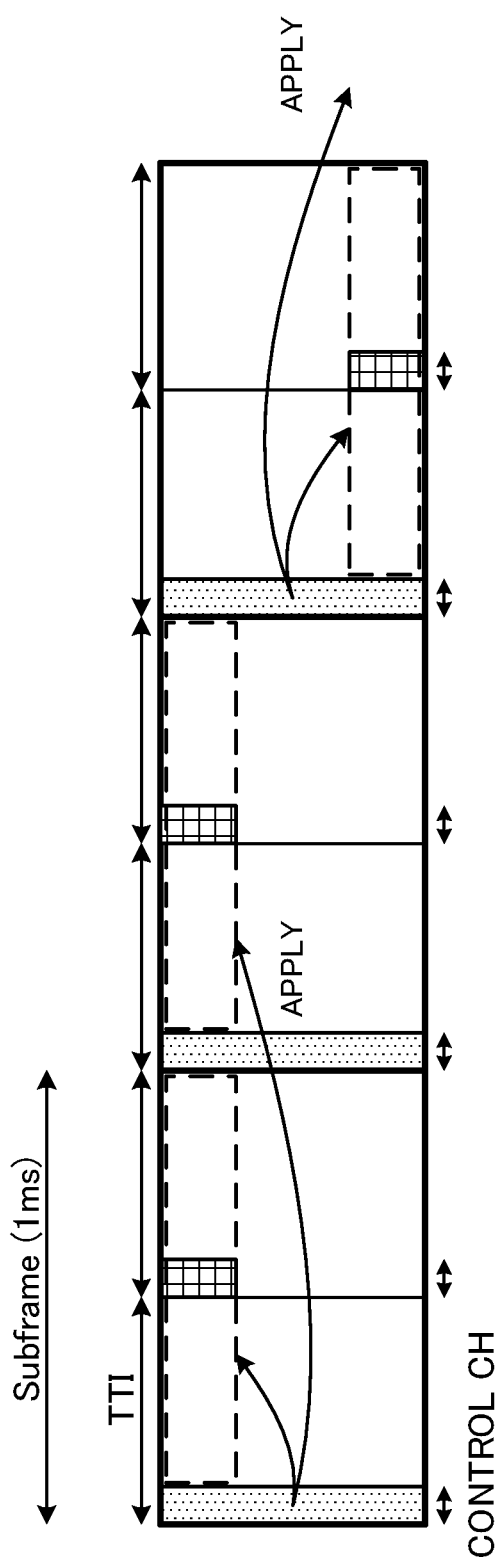
FIG. 12A and FIG. 12B are drawings illustrating another exemplary transmitting method of the DL channel for the shortened TTI according to the embodiment.
Figure 12B:
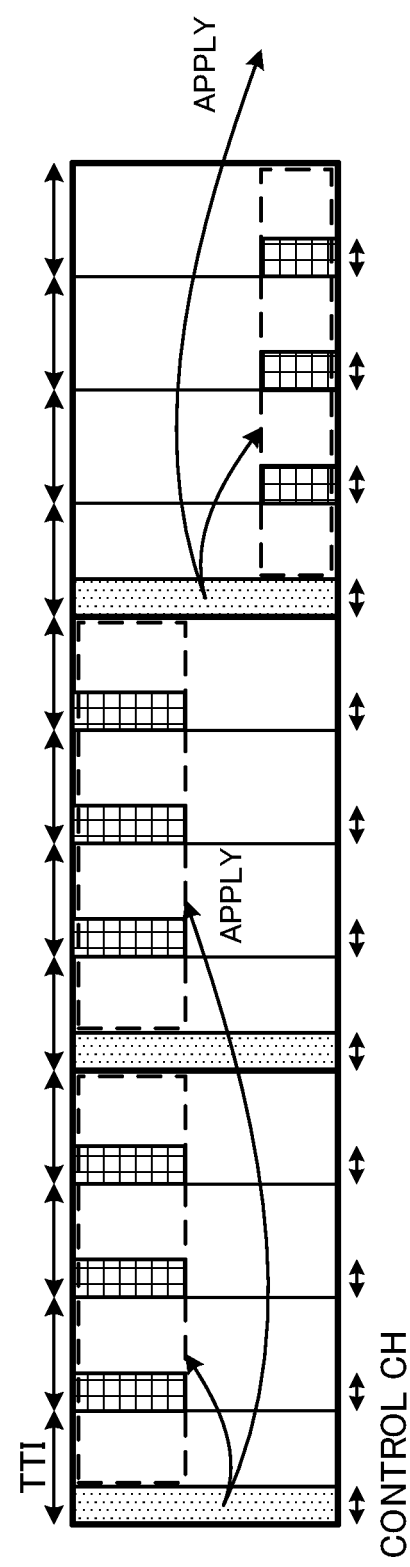

The radio base station may notify a predetermined DL channel (for example, the existing L1/L2 control channel) that specifies the frequency and/or the time resource of the L1/L2 control channel for the shortened TTI to the user terminal at rate of one time per a plurality of sub-frames (see FIG. 12). FIG. 12A illustrates the case where the shortened TTI is 0.5 ms. FIG. 12B illustrates the case where the shortened TTI is 0.25 ms.

FIG. 12A and FIG. 12B illustrate cases that notify the resource of the L1/L2 control channel for the shortened TTI to the user terminal at rate of one time per two sub-frames using the existing L1/L2 control channel. In this case, the user terminal can perform the receiving process with an assumption that the resource of the L1/L2 control channel for the shortened TTI is identical over two sub-frames. The transmission cycle of the predetermined DL channel that specifies the resource of the L1/L2 control channel for the shortened TTI is not limited to two sub-frames, and can be configured as necessary. For example, the predetermined DL channel may be notified to the user terminal at rate of one time by radio frames.

Alternatively, it may be constituted to transmit the predetermined DL channel that specifies the resource of the L1/L2 control channel for the shortened TTI for each sub-frame to change contents by plurality of sub-frames (see FIG. 13). FIG. 13A illustrate the case where the shortened TTI is 0.5 ms. FIG. 13B illustrate the case where the shortened TTI is 0.25 ms.

FIG. 13A and FIG. 13B illustrate a case that changes the content of the resource that the predetermined DL channel, which is transmitted for each sub-frame, indicates, per two sub-frames. Thus, transmitting the DL channel that indicates the identical resource content over a plurality of sub-frames allows the user terminal to understand the resource of the L1/L2 control channel of the shortened TTI even if the user terminal can accurately receive at least one of these control signals repeatedly transmitted at the plurality of sub-frames, thus ensuring higher reliable control.

(Third Aspect)

A third aspect describes a case that configures a plurality of frequencies and time resources (the resource candidates or the search spaces) of the L1/L2 control channel for the shortened TTI.

Figure 14A:
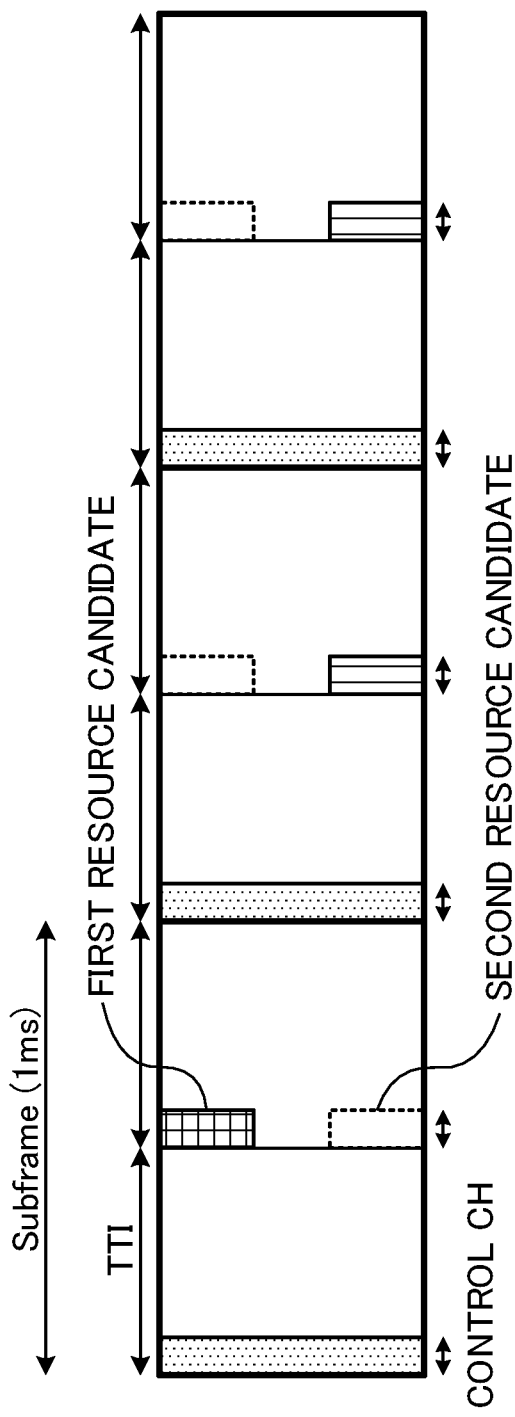
FIG. 14A and FIG. 14B are drawings illustrating another exemplary transmitting method of the DL channel for the shortened TTI according to the embodiment.
Figure 14B:
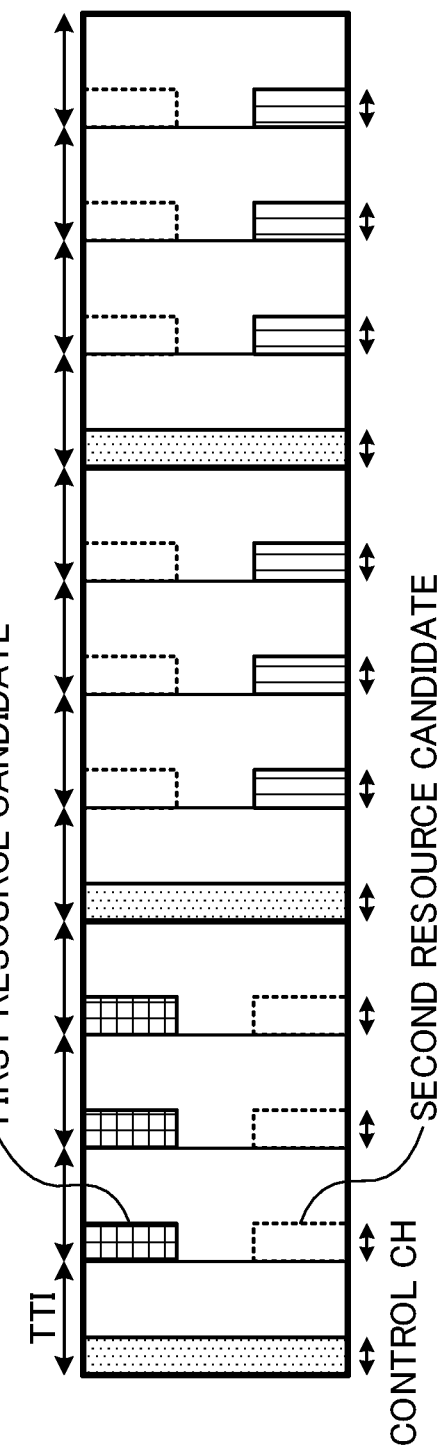

FIG. 14 illustrates a case that configures the plurality of frequencies and time resources (the resource candidates or the search spaces) of the L1/L2 control channel for the shortened TTI to transmit the L1/L2 control channel for the shortened TTI using a predetermined resource candidate for each TTI. FIG. 14A illustrates the case where the shortened TTI is 0.5 ms. FIG. 14B illustrates the case where the shortened TTI is 0.25 ms. Here, a case that configures two resource candidates (a first resource candidate and a second resource candidate) is described. However, the number of the resource candidates is not limited to this, and three or more resource candidates may be configured.

The user terminal can perform the receiving process (for example, blind-decoding) each with respect to the configured plurality of resource candidates at each shortened TTI. Information regarding the plurality of resource candidates can be notified from the radio base station to the user terminal using the upper layer signaling and the like. The user terminal preliminarily obtains the information regarding the first resource candidate and the second resource candidate by the upper layer signaling and the like, and then performs the receiving process with respect to the first resource candidate and the second resource candidate at the shortened TTI.

The radio base station can schedule (alternatively, map) the L1/L2 control channel for the shortened TTI in any of the resource candidates mapped to different resources. This allows regions of the resource candidates that are not used at each shortened TTI to be used for allocation of the DL channel (for example, the PDSCH) for the normal TTI. Consequently, corresponding to communication environment and the like, the PDSCH of the normal TTI and the L1/L2 control channel for the shortened TTI can be flexibly frequency-multiplexed (FDM).

When there are a plurality of L1/L2 control channels for the shortened TTI within the sub-frame (the normal TTI) and the plurality of L1/L2 control channels for the shortened TTI are each transmitted by different shortened TTIs, the radio base station can use the identical resource candidate (see FIG. 14B).

The user terminal can perform the receiving process (for example, blind-decoding) with an assumption that the control signals (DCI) addressed to own terminals are transmitted in the L1/L2 control channels for the shortened TTI allocated to the identical resource candidate, between different shortened TTIs in the identical sub-frame. In other words, the user terminal can assume that the control signals addressed to own terminals are not detected in the L1/L2 control channels for the shortened TTI configured at different frequency resources (the resource candidates), in the different shortened TTIs in the sub-frame.

In this case, if the control signal (DCI) addressed to own terminal is detected in the L1/L2 control channel of a certain shortened TTI in the sub-frame, it is only necessary to blind-decode any one resource candidate in subsequent L1/L2 control channels of the shortened TTI within the identical sub-frame, thus ensuring the process load reduction of the user terminal.

As illustrated in FIG. 14B, when configuring a plurality of L1/L2 control channels for the shortened TTIs within the identical sub-frame, mapping the L1/L2 control channels to the identical resource candidates between the shortened TTIs ensures effective frequency-multiplex (FDM) of the PDSCH of the normal TTI and the L1/L2 control channel for the shortened TTI.

(Modification)

Resource mapping in the L1/L2 control channel for the shortened TTI can be applied such that a function part of the system bandwidth is replaced to the function of the specified frequency resource, in the resource mapping method of the existing L1/L2 control channel. For example, to at least any of the PCFIC, the PHICH, the PDCCH, and the EPDCCH, the function of the system bandwidth in the existing mapping method can applied by being replaced to the function of the specified frequency resource at the shortened TTI.

Figure 15A:
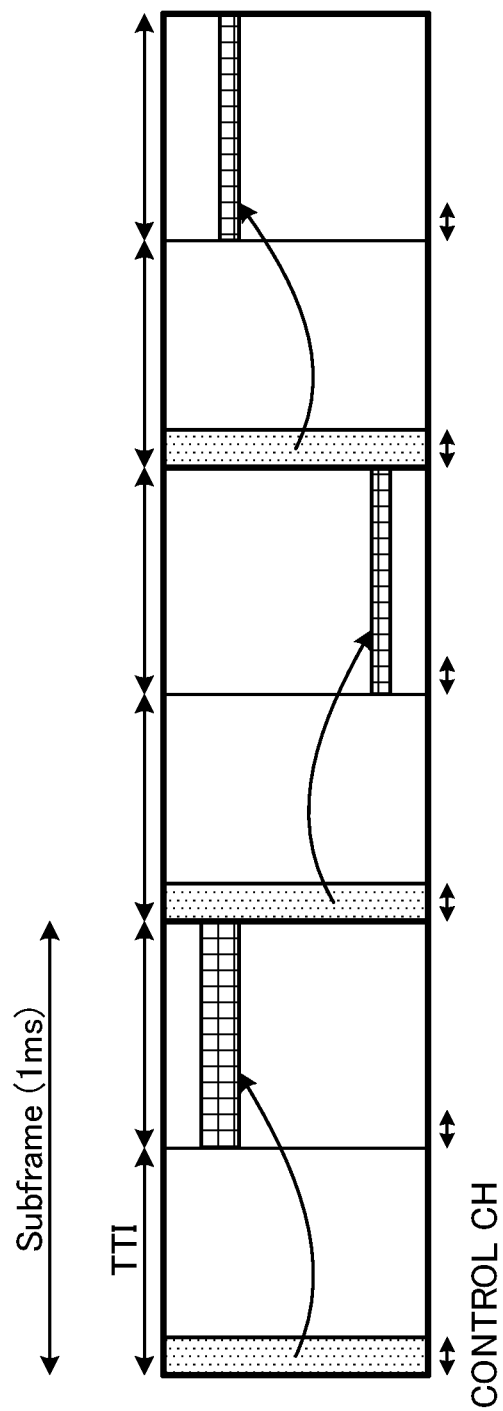
FIG. 15A and FIG. 15B are drawings illustrating another exemplary transmitting method of the DL channel for the shortened TTI according to the embodiment.
Figure 15B:
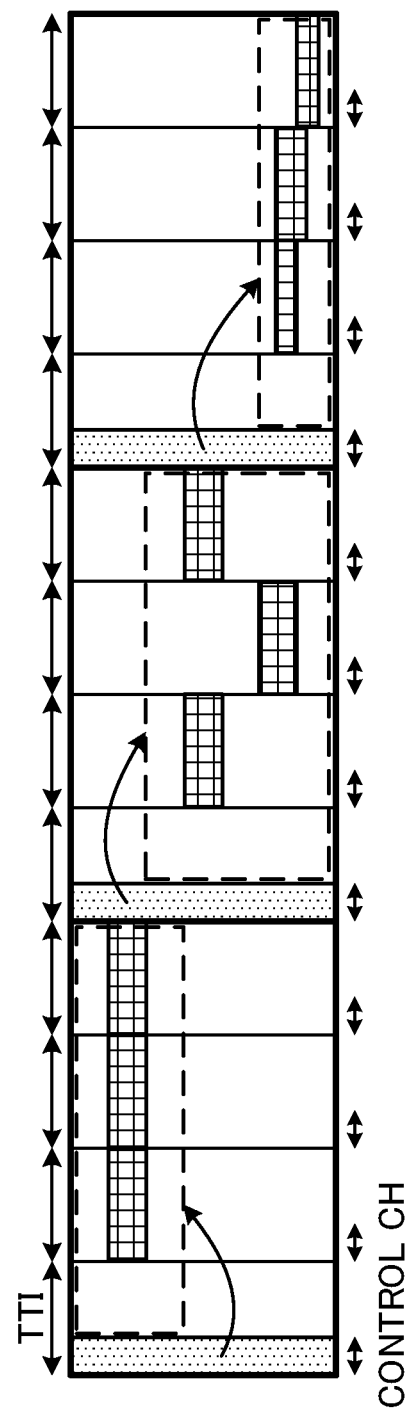

The L1/L2 control channel for the shortened TTI may have configuration where not all the PCFICH, the PHICH, the PDCCH, and the EPDCCH, but only one or a part of them is mapped to the shortened TTI. For example, FIG. 15 illustrates a case where the L1/L2 control channel for the shortened TTI is the EPDCCH. FIG. 15A illustrates the case where the shortened TTI is 0.5 ms. FIG. 15B illustrates the case where the shortened TTI is 0.25 ms. Obviously, the EPDCCH and another DL channel (for example, the PDCCH) may be combined, and other DL channels may be combined one another to use.

The user terminal can perform the receiving process (for example, demodulating) of the L1/L2 control channel for the shortened TTI using channel estimation information obtained based on a cell specific reference signal (CRS). Alternatively, the user terminal may perform the receiving process of the L1/L2 control channel for the shortened TTI using channel estimation information obtained based on a demodulation reference signal (DM-RS). Alternatively, it may be constituted such that the user terminal configures a reference signal used for the receiving process of the L1/L2 control channel for the shortened TTI, at the user terminal from the radio base station using the upper layer signaling.

Alternatively, it may be constituted such that the user terminal separately specifies the reference signal used for the receiving process of the L1/L2 control channel for the shortened TTI to perform the receiving process using channel estimation information obtained based on the additionally specified reference signal.

(Radio Communication System)

The following describes configuration of a radio communication system according to one embodiment of the present invention. The above-described radio communication methods according to the respective aspects are applied to this radio communication system. The above-described radio communication methods according to the respective aspects may be applied individually or may be applied in combination.

Figure 16:
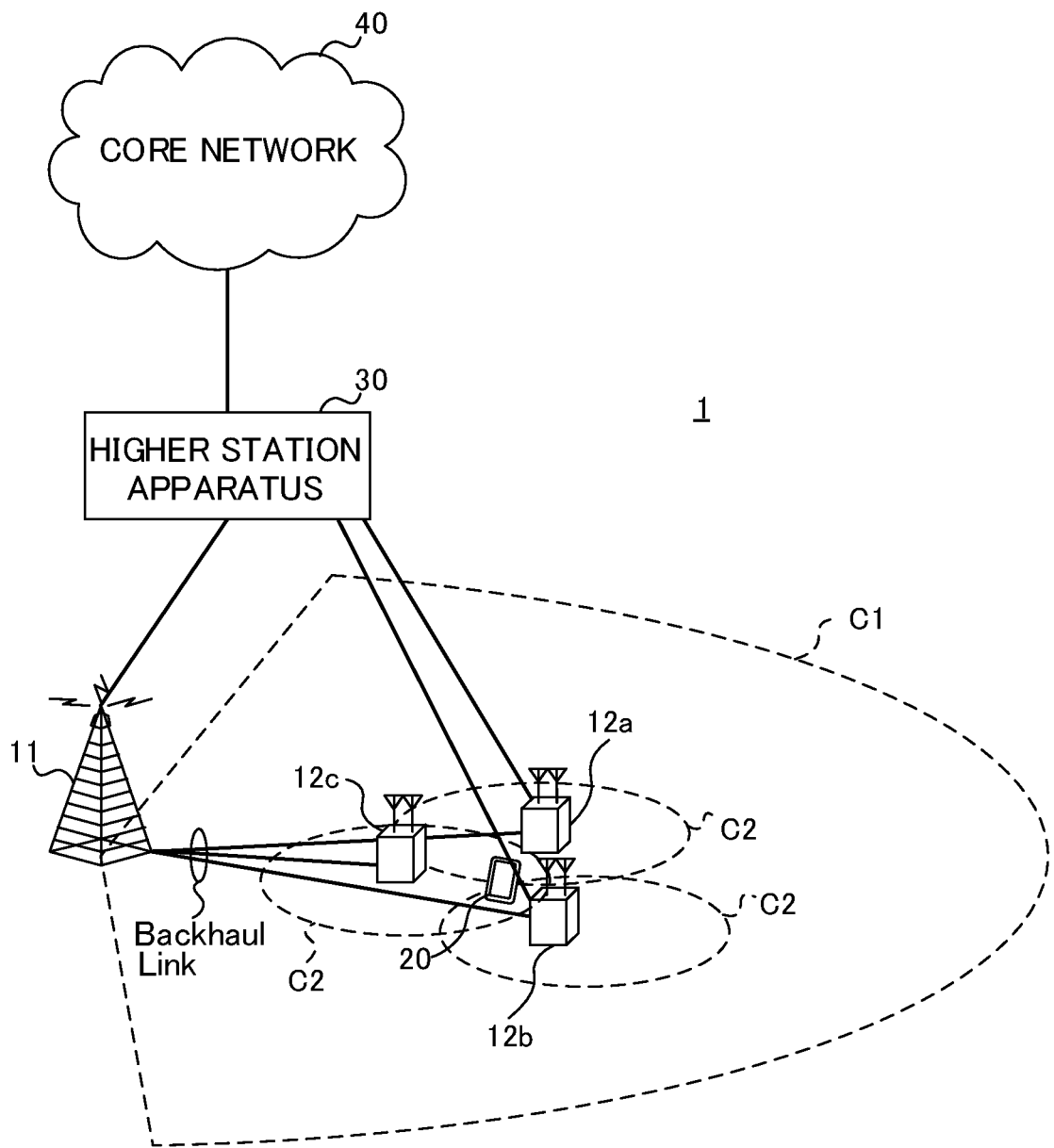
FIG. 16 is a schematic configuration diagram illustrating exemplary schematic configuration of a radio communication system according to the embodiment.

FIG. 16 is a drawing illustrating exemplary schematic configuration of the radio communication system according to the one embodiment of the present invention. A radio communication system 1 can apply Carrier Aggregation (CA) and/or Dual Connectivity (DC) that integrates a plurality of basic frequency blocks (Component Carriers) with a system bandwidth (for example, 20 MHz) of the LTE system as one unit. The radio communication system 1 may be also referred to as, for example, SUPER 3G, LTE-Advanced (LTE-A), IMT-Advanced, 4G, 5G and Future Radio Access (FRA).

The radio communication system 1 illustrated in FIG. 16 includes a radio base station 11 that forms a macrocell C1, and radio base stations 12a to 12c disposed within the macrocell C1 to form small cells C2 narrower than the macrocell C1. A user terminal 20 is disposed in the macrocell C1 and the respective small cells C2. It may be constituted such that numerology that varies between cells is applied. The numerology is signal design in a certain RAT, and a communication parameter set that characterizes RAT design.

The user terminal 20 can be coupled to both of the radio base station 11 and the radio base station 12. It is assumed that the user terminal 20 simultaneously uses the macrocell C1 and the small cell C2 that use different frequencies by the CA or the DC. The user terminal 20 can apply the CA or the DC using a plurality of cells (CCs) (for example, six or more CCs). The user terminal can use licensed band CCs and unlicensed band CCs as the plurality of cells. It may be constituted such that a TDD carrier that applies the shortened TTI is included in any of the plurality of cells.

Between the user terminal 20 and the radio base station 11, communication is possible using a carrier (referred to as, for example, an existing carrier and a Legacy carrier) whose bandwidth is narrow in a relatively low frequency bandwidth (for example, 2 GHz). On the other hand, between the user terminal 20 and the radio base station 12, a carrier whose bandwidth is wide in a relatively high frequency bandwidth (for example, 3.5 GHz and 5 GHz) may be used, and a carrier identical to that with the radio base station 11 may be used. The configuration of the frequency bandwidths used by the respective radio base stations is not limited to this.

Between the radio base station 11 and the radio base station 12 (alternatively, between two radio base stations 12), wired connection (for example, optical fiber and X2 interface compliant to Common Public Radio Interface (CPRI)) or radio connection can be constituted.

The radio base station 11 and the respective radio base stations 12 are each coupled to a higher station apparatus 30, and coupled to a core network 40 via the higher station apparatus 30. The higher station apparatus 30 includes, for example, an access gateway apparatus, a radio network controller (RNC), and a mobility management entity (MME). However, the higher station apparatus 30 is not limited to this. The respective radio base stations 12 may be coupled to the higher station apparatus 30 via the radio base station 11.

The radio base station 11, which is a radio base station having relatively wide coverage, may be referred to as, for example, a macro base station, an aggregation node, an eNodeB (eNB), and a transmission/reception point. The radio base station 12, which is a radio base station having local coverage, may be referred to as, for example, a small base station, a micro base station, a pico base station, a femto base station, a Home eNodeB (HeNB), a Remote Radio Head (RRH), and a transmission/reception point. Hereinafter, when the radio base stations 11 and 12 are not discriminated, they are collectively referred to as a radio base station 10.

Each user terminal 20, which is a terminal corresponding to various communication systems such as the LTE and the LTE-A, may include not only a mobile communication terminal but also a fixed communication terminal.

In the radio communication system 1, as a radio access system, the Orthogonal Frequency Division Multiple Access (OFDMA) is applied to the downlink, and the Single-Carrier Frequency Division Multiple Access (SC-FDMA) is applied to the uplink. The OFDMA is a multiple carrier transmission system that divides the frequency band into a plurality of narrow frequency bands (subcarriers) to communicate such that data is mapped to the respective subcarriers. The SC-FDMA is a single carrier transmission system that divides the system bandwidth into bands constituted of one or consecutive resource blocks for each terminal and uses a plurality of terminals with bands different from one another to reduce interference between the terminals. The uplink and downlink radio access systems are not limited to these combinations. The OFDMA may be used in the uplink.

In the radio communication system 1, as a downlink channel, for example, the Physical Downlink Shared Channel (PDSCH), a Physical Broadcast Channel (PBCH), and a downlink L1/L2 control channel, which are shared by the respective user terminals 20, are used. The PDSCH transmits, for example, user data, upper layer control information, and a System Information Block (SIB). The PBCH transmits a Master Information Block (MIB).

The downlink L1/L2 control channel includes, for example, the Physical Downlink Control Channel (the Physical Downlink Control Channel (PDCCH) and the Enhanced Physical Downlink Control Channel (EPDCCH)), the Physical Control Format Indicator Channel (PCFICH), and the Physical Hybrid-ARQ Indicator Channel (PHICH). The PDCCH transmits, for example, the Downlink Control Information (DCI) including scheduling information of the PDSCH and the PUSCH. The PCFICH transmits the number of the OFDM symbols used for the PDCCH. The PHICH transmits the delivery confirmation information (ACK/NACK) of the HARQ with respect to the PUSCH. The EPDCCH is frequency-division-multiplexed with the Physical Downlink Shared Channel (PDSCH) to be used for transmission of the DCI and the like, similar to the PDCCH.

In the radio communication system 1, as an uplink channel, for example, the Physical Uplink Shared Channel (PUSCH), the Physical Uplink Control Channel (PUCCH), and a Physical Random Access Channel (PRACH), which are shared by the respective user terminals 20, are used. The PUSCH transmits the user data and the upper layer control information. The PUSCH or the PUCCH transmits Uplink Control Information (UCI) including at least one of, for example, the delivery confirmation information (ACK/NACK) and radio quality information (CQI). The PRACH transmits a random access preamble for connection establishment with the cell.

<Radio Base Station>

Figure 17:
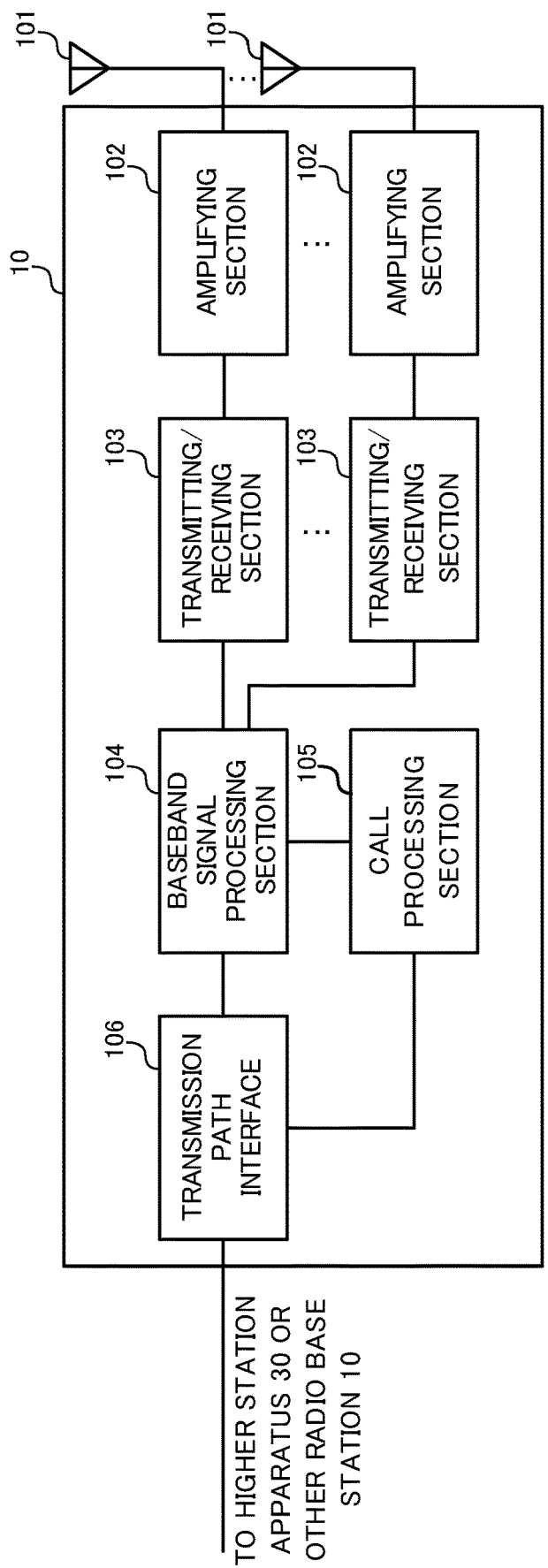
FIG. 17 is a drawing illustrating exemplary overall configuration of a radio base station according to the embodiment.

FIG. 17 is a drawing illustrating exemplary overall configuration of the radio base station according to the one embodiment of the present invention. The radio base station 10 includes a plurality of transmitting/receiving antennas 101, an amplifying section 102, a transmitting/receiving section 103, a baseband signal processing section 104, a call processing section 105, and a transmission path interface 106. The transmitting/receiving section 103 is constituted of a transmitting section and a receiving section.

The user data transmitted from the radio base station 10 to the user terminal 20 by the downlink is input to the baseband signal processing section 104 from the higher station apparatus 30 via the transmission path interface 106.

The baseband signal processing section 104 performs transmitting processes such as a process of a Packet Data Convergence Protocol (PDCP) layer, dividing and coupling of the user data, a transmitting process of the RLC layer such as a Radio Link Control (RLC) retransmission control, Medium Access Control (MAC) retransmission control (for example, a Hybrid Automatic Repeat reQuest (HARD) transmitting process), scheduling, transmitting format selection, channel coding, an Inverse Fast Fourier Transform (IFFT) process, and a precoding process on the user data to forward the user data to the transmitting/receiving section 103. The baseband signal processing section 104 also performs the transmitting processes such as the channel coding and the Inverse Fast Fourier Transform on the downlink control signal to forward the downlink control signal to the transmitting/receiving section 103.

The transmitting/receiving section 103 converts a baseband signal precoded to be output for each antenna from the baseband signal processing section 104, into a radio frequency band to transmit. A radio frequency signal frequency-converted at the transmitting/receiving section 103 is amplified by the amplifying section 102 to be transmitted from the transmitting/receiving antenna 101.

The transmitting/receiving section (transmitting section) 103 transmits the L1/L2 control channel (at least one of the PCFICH, the PHICH, the PDCCH, and the EPDCCH) to the user terminal. The transmitting/receiving section (transmitting section) 103 can transmit the L1/L2 control channel of the existing system and the L1/L2 control channel for the shortened TTI. The transmitting/receiving section 103 can be constituted of a transmitter/receiver, a transmitting/receiving circuit, or a transmitting/receiving apparatus described based on a common view in the technical field according to the present invention. The transmitting/receiving section 103 may be constituted as an integrated transmitting/receiving section, and may be constituted of the transmitting section and the receiving section.

On the other hand, for the uplink signal, the radio frequency signal received at the transmitting/receiving antenna 101 is amplified at the amplifying section 102. The transmitting/receiving section 103 receives the uplink signal amplified at the amplifying section 102. The transmitting/receiving section 103 frequency-converts a reception signal into a baseband signal to output the baseband signal to the baseband signal processing section 104.

The baseband signal processing section 104 performs the Fast Fourier Transform (FFT) process, an Inverse Discrete Fourier Transform (IDFT) process, error correction decoding, the receiving process of the MAC retransmission control, and the receiving process of the RLC layer and the PDCP layer on the user data included in the input uplink signal to forward the user data to the higher station apparatus 30 via the transmission path interface 106. The call processing section 105 performs call processes of, for example, configuration and release of a communication channel, state management of the radio base station 10, and management of the radio resource.

The transmission path interface 106 transmits/receives the signal to/from the higher station apparatus 30 via a predetermined interface. The transmission path interface 106 may transmit/receive (backhaul signaling) the signal to/from the adjacent radio base station 10 via the interface between the base stations (for example, the optical fiber and the X2 interface compliant to the Common Public Radio Interface (CPRI)).

Figure 18:
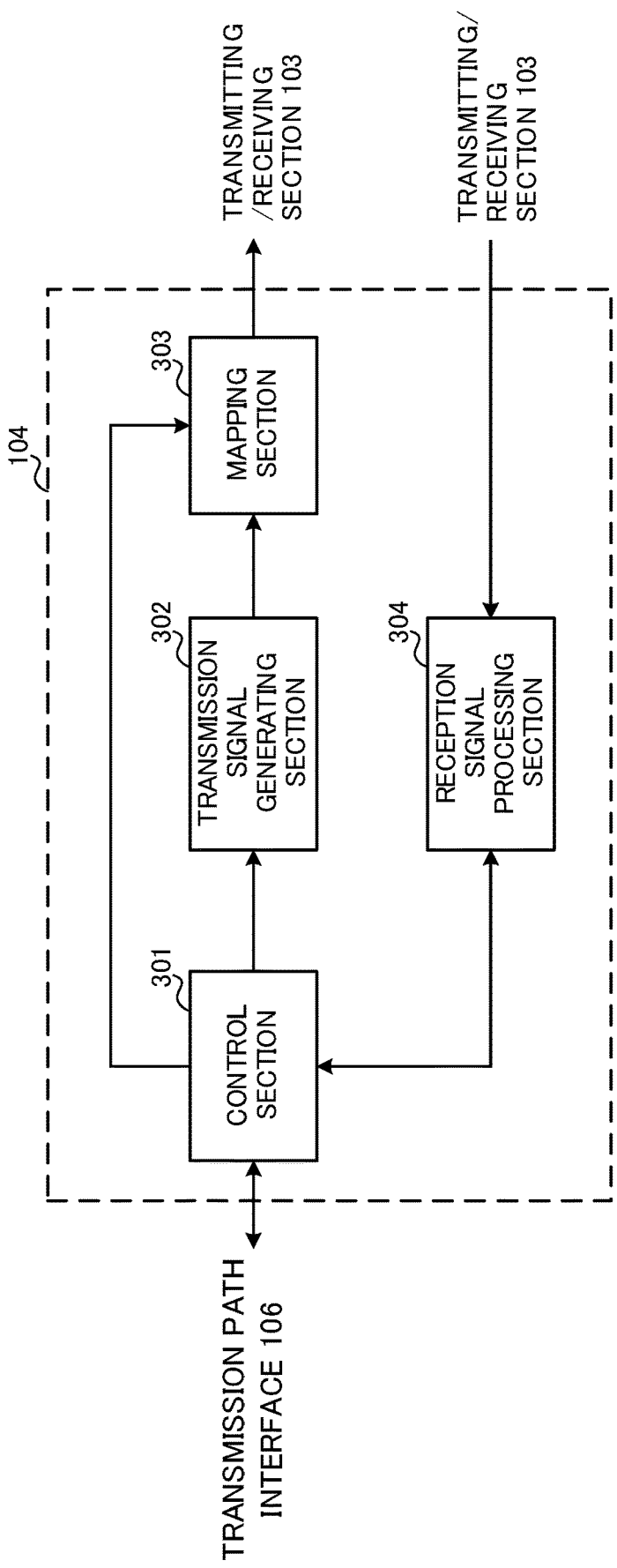
FIG. 18 is a drawing illustrating exemplary function configuration of the radio base station according to the embodiment.

FIG. 18 is a drawing illustrating exemplary function configuration of the radio base station according to the embodiment. FIG. 18 mainly illustrates function blocks at a characterizing part according to the embodiment, and it is assumed that the radio base station 10 also has other function blocks required for the radio communication. As illustrated in FIG. 18, the baseband signal processing section 104 includes a control section (scheduler) 301, a transmission signal generating section (generating section) 302, a mapping section 303, and a reception signal processing section 304.

The control section (scheduler) 301 controls scheduling (for example, resource allocation) of a downlink data signal transmitted at the PDSCH and the downlink control signal transmitted at the PDCCH and/or the EPDCCH. The control section (scheduler) 301 also controls scheduling of, for example, system information, a synchronization signal, paging information, the Cell-specific Reference Signal (CRS), and a Channel State Information Reference Signal (CSI-RS). The control section (scheduler) 301 controls scheduling of, for example, an uplink reference signal, an uplink data signal transmitted at the PUSCH, and an uplink control signal transmitted at the PUCCH and/or the PUSCH.

The control section 301 can control transmitting/receiving of the transmitting/receiving section (transmitting section) 103. For example, the control section 301 controls to transmit a first L1/L2 control channel (for example, the existing L1/L2 control channel) for each first TTI (for example, normal TTI) and transmit a second L1/L2 control channel (for example, the L1/L2 control channel for the shortened TTI) at a second TTI (for example, the shortened TTI). The control section 301 may be a controller, a control circuit, or a control apparatus described based on the common view in the technical field according to the present invention.

The transmission signal generating section 302 generates the DL signals (including the downlink data signal and the downlink control signal) to output the DL signals to the mapping section 303, based on an instruction from the control section 301. Specifically, the transmission signal generating section 302 generates the downlink data signal (PDSCH) including the user data to output the mapping section 303. The transmission signal generating section 302 generates the downlink control signal (PDCCH/EPDCCH) including the DCI (UL grant) to output to the mapping section 303. The transmission signal generating section 302 generates the downlink reference signal such as the CRS and the CSI-RS to output to the mapping section 303.

The mapping section 303 maps the DL signal generated at the transmission signal generating section 302 to a predetermined radio resource to output the DL signal to the transmitting/receiving section 103, based on the instruction from the control section 301. The mapping section 303 can be a mapper, a mapping circuit, or a mapping apparatus described based on the common view in the technical field according to the present invention.

The reception signal processing section 304 performs the receiving process (for example, demapping, demodulating, and decoding) with respect to the UL signal (for example, the HARQ-ACK and the PUSCH) transmitted from the user terminal 20. A process result is output to the control section 301. The reception signal processing section 304 can be constituted of a signal processor, a signal processing circuit, or a signal processing apparatus, and a measuring instrument, a measuring circuit, or a measuring apparatus described based on the common view in the technical field according to the present invention.

<User Terminal>

Figure 19:
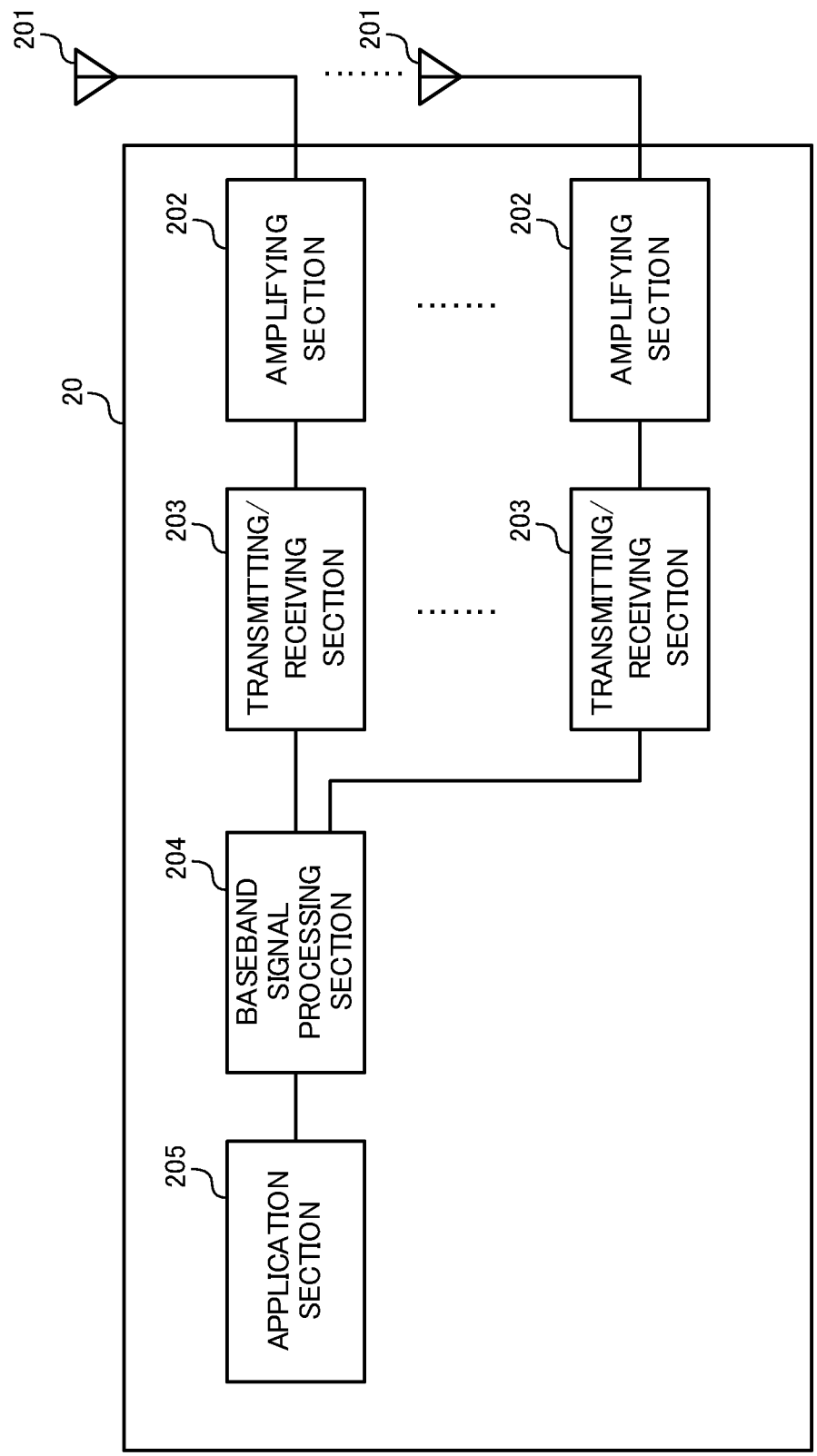
FIG. 19 is a drawing illustrating exemplary overall configuration of a user terminal according to the embodiment.

FIG. 19 is a drawing illustrating exemplary overall configuration of the user terminal according to the one embodiment of the present invention. The user terminal 20 includes a plurality of transmitting/receiving antennas 201, amplifying sections 202, and transmitting/receiving sections 203, a baseband signal processing section 204, and an application section 205 for MIMO transmission. The transmitting/receiving section 203 may be constituted of a transmitting section and a receiving section.

The radio frequency signals received at the plurality of transmitting/receiving antenna 201 are each amplified at the amplifying sections 202. The respective transmitting/receiving sections 203 receive the downlink signals amplified at the amplifying sections 202. The transmitting/receiving section 203 frequency-converts the reception signal into the baseband signal to output to the baseband signal processing section 204.

The transmitting/receiving section (receiving section) 203 receives the DL signal (for example, the L1/L2 control channel) transmitted from the radio base station. For example, the transmitting/receiving section (receiving section) 203 receives the first L1/L2 control channel (for example, the existing L1/L2 control channel) transmitted for each first TTI (for example, normal TTI) and the second L1/L2 control channel (for example, the L1/L2 control channel for the shortened TTI) transmitted at the second TTI (for example, the shortened TTI) (see FIG. 8).

The transmitting/receiving section (receiving section) 203 can receive the second L1/L2 control channel in a bandwidth narrower than a bandwidth to which the first L1/L2 control channel is allocated (see FIG. 9). The second L1/L2 control channel transmitted at the second TTI is allocated to a different position and/or a different bandwidth for each predetermined period (for example, first TTI length and/or radio frame). The transmitting/receiving section 203 can be a transmitter/receiver, a transmitting/receiving circuit, or a transmitting/receiving apparatus described based on the common view in the technical field according to the present invention.

The baseband signal processing section 204 performs, for example, an FFT process, the error correction decoding, and the receiving process of the retransmission control, with respect to the input baseband signal. The user data in the downlink is forwarded to the application section 205. The application section 205 performs, for example, a process regarding a layer upper than a physical layer and a MAC layer. Among the data in the downlink, the notification information is also forwarded to the application section 205.

On the other hand, the user data in the uplink is input to the baseband signal processing section 204 from the application section 205. The baseband signal processing section 204 performs, for example, the transmitting process of the retransmission control (for example, the transmitting process of the HARQ), the channel coding, the precoding, a Discrete Fourier Transform (DFT) process, and an IFFT process to forward to the respective transmitting/receiving sections 203. The transmitting/receiving section 203 converts the baseband signal output from the baseband signal processing section 204 into the radio frequency band to transmit. The radio frequency signal frequency-converted at the transmitting/receiving section 203 is amplified at the amplifying section 202 to be transmitted from the transmitting/receiving antenna 201.

Figure 20:
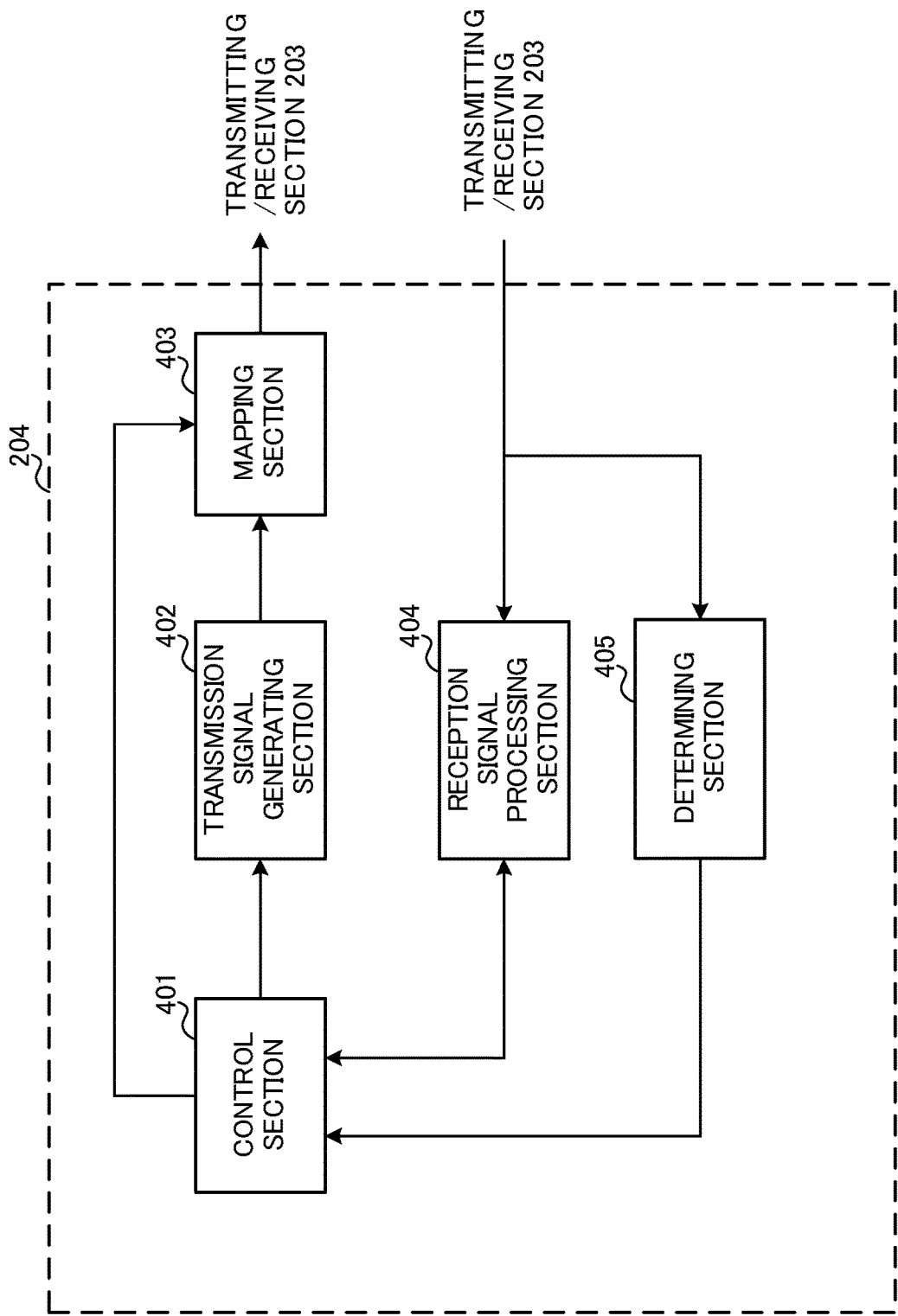
FIG. 20 is a drawing illustrating exemplary function configuration of the user terminal according to the embodiment.

FIG. 20 is a drawing illustrating exemplary function configuration of the user terminal according to the embodiment. FIG. 20 mainly illustrates function blocks at a characterizing part according to the embodiment, and it is assumed that the user terminal 20 also has other function blocks required for the radio communication. As illustrated in FIG. 20, the baseband signal processing section 204 included in the user terminal 20 includes a control section 401, a transmission signal generating section 402, a mapping section 403, a reception signal processing section 404, and a determining section 405.

The control section 401 obtains the downlink control signal (the signal transmitted in the PDCCH/EPDCCH) and the downlink data signal (the signal transmitted in the PDSCH) transmitted from the radio base station 10, from the reception signal processing section 404. The control section 401 controls generation of the uplink control signal (for example, a delivery confirmation signal (HARQ-ACK)) and the uplink data signal based on, for example, a result that necessity of the retransmission control with respect to the downlink control signal and the downlink data signal has been determined. Specifically, the control section 401 can control the transmission signal generating section 402, the mapping section 403, and the reception signal processing section 404.

The control section 401 can control downlink data receiving and/or uplink data transmitting based on the second L1/L2 control channel to determine an allocation bandwidth of the downlink data and/or the uplink data regardless of the allocation bandwidth of the second L1/L2 control channel (see FIG. 10). The control section 401 can determine the allocation position of the second L1/L2 control channel, based on the Physical Control Format Indicator Channel (PCFICH) and/or the Physical Downlink Control Channel (the PDCCH and/or the EPDCCH) included in the first L1/L2 control channel (see FIG. 11).

When a plurality of frequency domains or search spaces that will be allocation candidates of the Physical Downlink Control Channel included in the second L1/L2 control channel are configured, the control section 401 can control receiving of the Physical Downlink Control Channel included in the second L1/L2 control channel with respect to each frequency domain (see FIG. 14A). Alternatively, when a plurality of frequency domains or search spaces that will be allocation candidates of the second L1/L2 control channel (for example, the Physical Downlink Control Channel) are configured over different second TTIs, and a plurality of second L1/L2 control channels are included in the first TTI, the control section 401 can perform receiving with an assumption that the plurality of second L1/L2 control channels are allocated to an identical frequency domain (see FIG. 14B).

The control section 401 can be a controller, a control circuit, or a control apparatus described based on the common view in the technical field according to the present invention.

The transmission signal generating section 402 generates the UL signal to output to the mapping section 403, based on an instruction from the control section 401. For example, the transmission signal generating section 402 generates the uplink control signal such as the delivery confirmation signal (HARQ-ACK) and channel state information (CSI) based on the instruction from the control section 401.

The transmission signal generating section 402 generates the uplink data signal based on the instruction from the control section 401. For example, when the downlink control signal notified from the radio base station 10 includes the UL grant, the control section 401 instructs the transmission signal generating section 402 to generate the uplink data signal. The transmission signal generating section 402 can be a signal generator, a signal generation circuit, or a signal generation apparatus described based on the common view in the technical field according to the present invention.

The mapping section 403 maps the uplink signal (the uplink control signal and/or the uplink data) generated at the transmission signal generating section 402 to the radio resource to output to the transmitting/receiving section 203, based on the instruction from the control section 401. The mapping section 403 can be a mapper, a mapping circuit, or a mapping apparatus described based on the common view in the technical field according to the present invention.

The reception signal processing section 404 performs the receiving process (for example, demapping, demodulating, and decoding) with respect to the DL signal (for example, the downlink control signal transmitted from the radio base station and the downlink data signal transmitted in the PDSCH). The reception signal processing section 404 outputs the information received from the radio base station 10 to the control section 401 and the determining section 405. The reception signal processing section 404 outputs, for example, the notification information, the system information, the RRC signaling, and the DCI to the control section 401.

The reception signal processing section 404 can be constituted of a signal processor, a signal processing circuit, or a signal processing apparatus, and a measuring instrument, a measuring circuit, or a measuring apparatus described based on the common view in the technical field according to the present invention. The reception signal processing section 404 can constitute the receiving section according to the present invention.

The determining section 405 performs retransmission control determination (ACK/NACK) and outputs a determination result to the control section 401, based on a decoding result of the reception signal processing section 404. When the downlink signals (PDSCHs) are transmitted from a plurality of CCs (for example, six or more CCs), the determining section 405 can perform the retransmission control determination (ACK/NACK) for the respective CCs to output to the control section 401. The determining section 405 can be constituted of a determination circuit or a determination apparatus described based on the common view in the technical field according to the present invention.

(Hardware Configuration)

The above-described block diagrams used for the description of the embodiment illustrate blocks by functions. These function blocks (constitution sections) are implemented with an optional combination of hardware and/or software. An implementation means of each function block is not specifically limited. That is, each function block may be implemented with physically-bounded one apparatus. By coupling physically-separate two or more apparatuses with wire or without wire, each function block may be implemented with these plurality of apparatuses.

Figure 21:
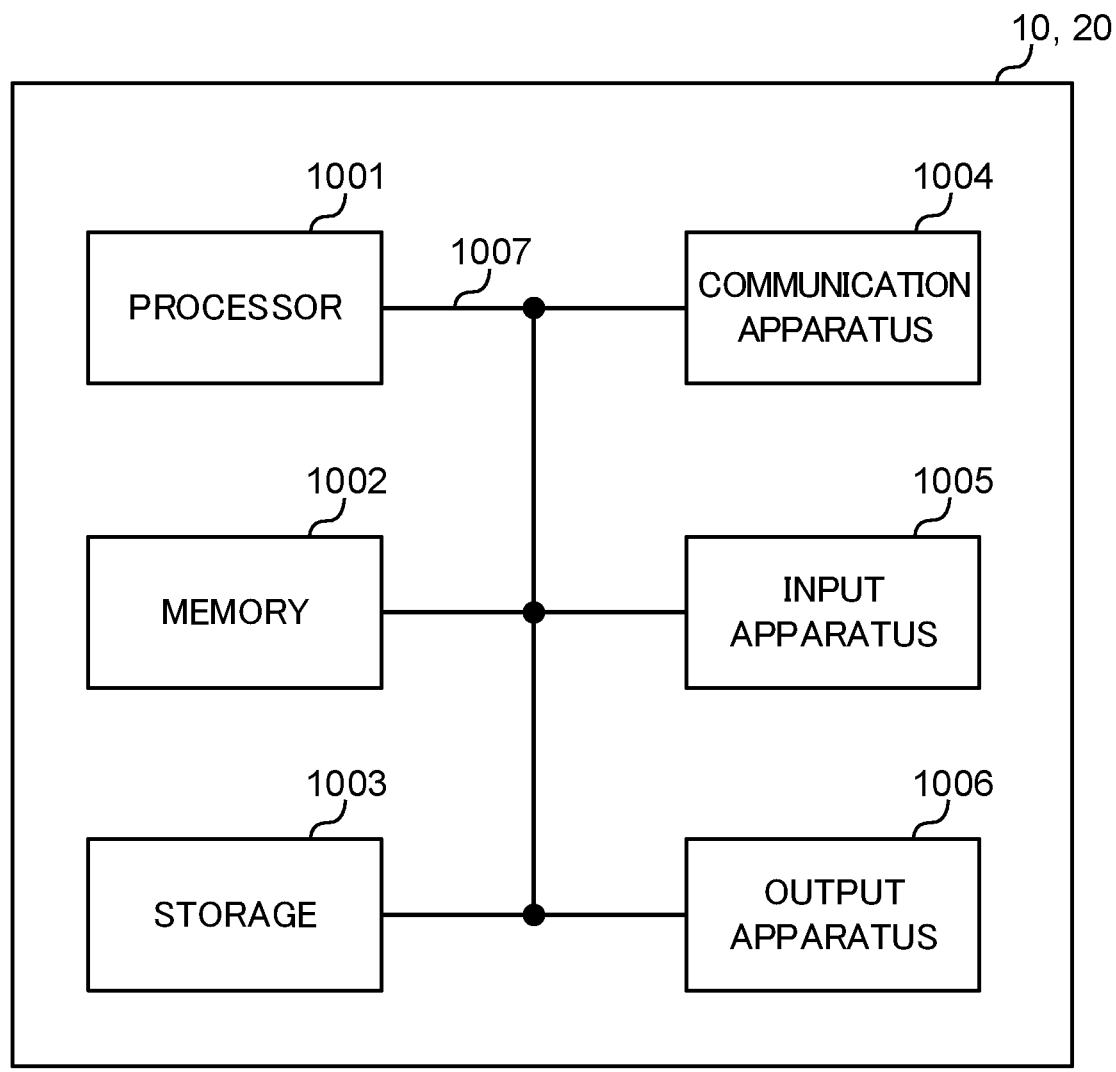
FIG. 21 is a drawing illustrating exemplary hardware configuration of the radio base station and the user terminal according to one embodiment of the present invention.

For example, the radio base station, the user terminal, and the like in the one embodiment of the present invention may function as computers that perform the processes of the radio communication method of the present invention. FIG. 21 is a drawing illustrating exemplary hardware configuration of the radio base station and the user terminal according to the one embodiment of the present invention. The above-described radio base station 10 and user terminal 20 may be each physically constituted as a computer apparatus including, for example, a processor 1001, a memory 1002, a storage 1003, a communication apparatus 1004, an input apparatus 1005, an output apparatus 1006, and a bus 1007.

In the following description, the word "an apparatus" can be reworded to, for example, a circuit, a device, and a unit. The hardware configuration of the radio base station 10 and the user terminal 20 may include one or more of each apparatus illustrated in the drawing, and may be constituted without a part of the apparatuses.

Each function in the radio base station 10 and the user terminal 20 is achieved such that the processor 1001 performs arithmetic operation such that predetermined software (program) is read into the hardware such as the processor 1001 and the memory 1002, to control communication by the communication apparatus 1004 and reading and/or writing of data in the memory 1002 and the storage 1003.

The processor 1001, for example, operates an operating system to control the computer as a whole. The processor 1001 may be constituted of a Central Processing Unit (CPU) including, for example, an interface with peripheral apparatuses, a control apparatus, an arithmetic apparatus, and a register. For example, the above-described baseband signal processing section 104 (204), call processing section 105, and the like may be implemented with the processor 1001.

The processor 1001 reads out a program (program code), a software module, and data from the storage 1003 and/or the communication apparatus 1004 to the memory 1002, and then performs various processes in accordance with them. As the program, a program that causes the computer to execute at least a part of the operation described in the above-described embodiment is used. For example, the control section 401 of the user terminal 20 may be stored in the memory 1002 to be achieved by a control program that operates in the processor 1001. Other function blocks may be similarly achieved.

The memory 1002, which is a computer readable recording medium, may be constituted of, for example, at least one of a Read Only Memory (ROM), an Erasable Programmable ROM (EPROM), and a Random Access Memory (RAM). The memory 1002 may be also referred to as, for example, a register, a cache, and a main memory (main storage unit). The memory 1002 can store, for example, a program (program code) and a software module executable for performing the radio communication method according to the one embodiment of the present invention.

The storage 1003, which is a computer readable recording medium, may be constituted of, for example, at least one of an optical disk such as a Compact Disc ROM (CD-ROM), a hard disk drive, a flexible disk, a magneto-optic disk, and a flash memory. The storage 1003 may be referred to as an auxiliary storage unit.

The communication apparatus 1004, which is hardware (a transmitting/receiving device) for communicating between the computers via wired and/or wireless (radio) network, is also referred to as, for example, a network device, a network controller, a network card, and a communication module. For example, the above-described transmitting/receiving antenna 101 (201), amplifying section 102 (202), transmitting/receiving section 103 (203), and transmission path interface 106 may be implemented with the communication apparatus 1004.

The input apparatus 1005 is an input device (for example, a keyboard and a computer mouse) that accepts input from outside. The output apparatus 1006 is an output device (for example, a display and a speaker) that performs output to outside. The input apparatus 1005 and the output apparatus 1006 may have an integral configuration (for example, a touch panel).

The respective apparatuses such as the processor 1001 and the memory 1002 are coupled by the bus 1007 for communicating information. The bus 1007 may be constituted of a single bus, and may be constituted of different buses between the apparatuses.

The radio base station 10 and the user terminal 20 may be constituted including the hardware such as a microprocessor, a Digital Signal Processor (DSP), an Application Specific Integrated Circuit (ASIC), a Programmable Logic Device (PLD), and a Field Programmable Gate Array (FPGA). This hardware may implement a part of or all the respective function blocks. For example, the processor 1001 may be implemented with at least one of this hardware.

The terms described in this description and/or the terms required for understanding this description may be replaced by terms having identical or similar meaning. For example, the channel and/or the symbol may be a signal (signaling). The signal may be a message. The Component Carrier (CC) may be also referred to as, for example, a cell, a frequency carrier, and a carrier frequency.

The radio frame may be constituted of one or more periods (frames) in the time domain. Each of this one or more periods (frames) that constitute the radio frame may be referred to as a sub-frame. Furthermore, the sub-frame may be constituted of one or more slots in the time domain. Furthermore, the slot may be constituted of one or more symbols (for example, OFDM symbols and SC-FDMA symbols) in the time domain.

The radio frame, the sub-frame, the slot, and the symbol each represent a time unit to transmit the signal. For the radio frame, the sub-frame, the slot, and the symbol, another name corresponding to each of them may be used. For example, one sub-frame may be referred to as a Transmission Time Interval (TTI), a plurality of consecutive sub-frames may be referred to as a TTI, and one slot may be referred to as a TTI. That is, the sub-frame or the TTI may be a sub-frame (1 ms) in the existing LTE, may be a period shorter than 1 ms (for example, one to 13 symbols), and may be a period longer than 1 ms.

Here, the TTI is, for example, a minimum time unit of scheduling in the radio communication. For example, in the LTE system, the radio base station performs scheduling that allocates the radio resource (for example, a frequency bandwidth and transmission power available for each user terminal) in a unit of TTI, with respect to each user terminal. The definition of the TTI is not limited to this.

The Resource Block (RB), which is a resource allocation unit in the time domain and the frequency domain, may include one or more consecutive subcarriers in the frequency domain. The RB may include one or more symbols in the time domain, and may be a length of one slot, one sub-frame, or one TTI. One TTI and one sub-frame each may be constituted of one or more resource blocks. The RB may be referred to as, for example, a Physical Resource Block (Physical RB (PRB)), a PRB pair, and a RB pair.

The resource block may be constituted of one or more Resource Elements (REs). For example, one RE may be a radio resource region of one subcarrier and one symbol.

The above-described structures of the radio frame, the sub-frame, the slot, the symbol, and the like are only illustrative. For example, the number of the sub-frames included in the radio frame, the number of the slots included in the sub-frame, the number of the symbols and the RBs included in the slot, the number of the subcarriers included in the RB, and the configuration such as the number of the symbols, the symbol length, and the Cyclic Prefix (CP) length within the TTI can be variously changed.

For example, the information and the parameter described in this description may be represented by absolute values, may be represented by relative values from predetermined values, and may be represented by corresponding other information. For example, the radio resource may be instructed by a predetermined index.

For example, the information and the signal described in this description may be represented using any of various different techniques. For example, the data, the order, the command, the information, the signal, the bit, the symbol, and the chip mentionable over the above-described entire description may be represented by voltage, current, electromagnetic wave, magnetic field or magnetic particle, optical field or photon, or an optional combination of them.

For example, the software, the order, and the information may be transmitted and received via a transmission medium. For example, when the software is transmitted from a website, a server, or another remote source using wired techniques (for example, a coaxial cable, an optical fiber cable, a twisted pair, and a digital subscriber line (DSL)) and/or wireless techniques (for example, infrared and microwave), these wired techniques and/or wireless techniques are included in the definition of the transmission medium.

The radio base station in this description may be reworded to the user terminal. For example, the respective aspects/embodiments of the present invention may be applied to a configuration where the communication between the radio base station and the user terminal is replaced by communication between a plurality of user terminals (Device-to-Device (D2D)). In this case, the user terminal 20 may have the above-described functions that the radio base station 10 has. The words such as "uplink" and "downlink" may be reworded to "side." For example, the uplink channel may be reworded to the side channel.

Similarly, the user terminal in this description may be reworded to the radio base station. In this case, the radio base station 10 may have the above-described functions that the user terminal 20 has.

The respective aspects/embodiments described in this description may be used alone, may be used in combination, and may be used by switching in accordance with execution. The notification of the predetermined information (for example, the notification "being X") is not limited to explicit execution, and may be implicit execution (for example, by not performing the notification of this predetermined information).

The notification of the information is not limited to the aspects/embodiments described in this description, and may be performed by another method. For example, the notification of the information may be performed by physical layer signaling (for example, Downlink Control Information (DCI) and Uplink Control Information (UCI)), the upper layer signaling (for example, Radio Resource Control (RRC) signaling, the notification information (for example, Master Information Block (MIB) and System Information Block (SIB)), and Medium Access Control (MAC) signaling), another signal, or combination of them. The RRC signaling may be referred to as a RRC message, for example, and may be RRC Connection Setup (RRCConnectionSetup) message and RRC Connection Reconfiguration (RRCConnectionReconfiguration) message. The MAC signaling may be notified by, for example, a MAC Control Element (CE).

The respective aspects/embodiments described in this description may be applied to a system that uses Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-RAT), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), and another appropriate radio communication method, and/or a next generation system extended based on them.

For, for example, the process procedure, the sequence, and the flowchart of the respective aspects/embodiments described in this description, the order may be interchanged without inconsistencies. For example, for the method described in this description, various step elements are presented in an exemplary order. The order is not limited to the presented specific order.

Now, although the present invention has been described in detail, it should be obvious to a person skilled in the art that the present invention is by no means limited to the embodiments described herein. For example, the above-described respective embodiments may be used alone, and may be used in combination. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

This application is based on Japanese Patent Application No. 2016-016194 filed on Jan. 29, 2016, and the disclosure of which is incorporated herein.

The invention claimed is:

1. A terminal comprising:
 a receiver that monitors
  a first physical downlink control channel (PDCCH) in a first period within 14 symbols and
  a second PDCCH in a second period within the 14 symbols, the second period being located after the first period; and
 a processor that
  decodes a first physical downlink shared channel (PDSCH) based on the first PDCCH, and
  decodes a second PDSCH based on the second PDCCH,
  the first PDSCH being located in the first period following the first PDCCH, and
  the second PDSCH being located in the second period following the second PDCCH,
 wherein the first PDCCH, the second PDCCH, the first PDSCH and the second PDSCH are in a same band,
 wherein the band is part of a band configured for a cell,
 wherein the receiver monitors the second PDCCH in a plurality of resources that are configured by higher layer signaling, wherein a length of the first period and a length of the second period are determined based on configuration of subcarrier spacing,
wherein the receiver receives information regarding candidates of frequency resources that include allocation positions of bandwidths in the second period, and
wherein the processor determines, from the candidates, one bandwidth of a given timing.

2. A radio communication method for a terminal, comprising:
monitoring
a first physical downlink control channel (PDCCH) in a first period within 14 symbols and
a second PDCCH in a second period within the 14 symbols, the second period being located after the first period; and
decoding
a first physical downlink shared channel (PDSCH) based on the first PDCCH and
decoding a second PDSCH based on the second PDCCH,
the first PDSCH being located in the first period following the first PDCCH, and
the second PDSCH being located in the second period following the second PDCCH,
wherein the first PDCCH, the second PDCCH, the first PDSCH and the second PDSCH are in a same band,
wherein the band is part of a band configured for a cell,
wherein the terminal monitors the second PDCCH in a plurality of resources that are configured by higher layer signaling,
wherein a length of the first period and a length of the second period are determined based on configuration of subcarrier spacing,
wherein the terminal receives information regarding candidates of frequency resources that include allocation positions of bandwidths in the second period, and
wherein the terminal determines, from the candidates, one bandwidth of a given timing.

3. A base station comprising:
a processor that maps
a first physical downlink control channel (PDCCH) and a first physical downlink shared channel (PDSCH) in a first period within 14 symbols and maps a second PDCCH and
a second PDSCH in a second period within the 14 symbols, the second period being located after the first period,
the first PDSCH being located after the first PDCCH and
the second PDSCH being located after the second PDCCH; and
a transmitter that transmits
the first PDCCH,
the first PDSCH,
the second PDCCH and
the second PDSCH,
the first PDCCH scheduling the first PDSCH and
the second PDCCH scheduling the second PDSCH,
wherein the first PDCCH, the second PDCCH, the first PDSCH and the second PDSCH are in a same band,
wherein the band is part of a band configured for a cell,
wherein the transmitter transmits the second PDCCH in a plurality of resources that are configured by higher layer signaling,
wherein a length of the first period and a length of the second period are determined based on configuration of subcarrier spacing,
wherein the transmitter transmits information regarding candidates of frequency resources that include allocation positions of bandwidths in the second period, and
wherein the processor indicates, from the candidates, one bandwidth of a given timing.

4. A system comprising a terminal and a base station, wherein:
the base station comprises:
a first processor that maps
a first physical downlink control channel (PDCCH) and a first physical downlink shared channel (PDSCH) in a first period within 14 symbols and maps a second PDCCH and
a second PDSCH in a second period within the 14 symbols, the second period being located after the first period,
the first PDSCH being located after the first PDCCH and
the second PDSCH being located after the second PDCCH; and
a transmitter that transmits
the first PDCCH,
the first PDSCH,
the second PDCCH and
the second PDSCH,
the first PDCCH scheduling the first PDSCH and
the second PDCCH scheduling the second PDSCH; and
the terminal comprises:
a receiver that monitors the first PDCCH and the second PDCCH; and
a second processor that decodes the first PDSCH based on the first PDCCH, and decodes a second PDSCH based on the second PDCCH,
wherein the first PDCCH, the second PDCCH, the first PDSCH and the second PDSCH are in a same band,
wherein the band is part of a band configured for a cell,
wherein the receiver monitors the second PDCCH in a plurality of resources that are configured by higher layer signaling,
wherein a length of the first period and a length of the second period are determined based on configuration of subcarrier spacing,
wherein the receiver receives information regarding candidates of frequency resources that include allocation positions of bandwidths in the second period, and
wherein the second processor determines, from the candidates, one bandwidth of a given timing.

5. The terminal according to claim 1, wherein the second PDSCH is mapped to a frequency resource that uses a function of the bandwidth of the second period.

* * * * *